United States Patent
Shrivastava et al.

(10) Patent No.: US 12,556,309 B2
(45) Date of Patent: Feb. 17, 2026

(54) METHOD AND SYSTEM FOR HANDLING LOSSLESS OPERATIONS FOR MBS IN 5G COMMUNICATION NETWORK

(71) Applicant: Samsung Electronics Co., Ltd., Gyeonggi-do (KR)

(72) Inventors: Vinay Kumar Shrivastava, Bangalore (IN); Fasil Abdul Latheef, Bangalore (IN); Sangkyu Baek, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 282 days.

(21) Appl. No.: 18/032,382

(22) PCT Filed: Oct. 21, 2021

(86) PCT No.: PCT/KR2021/014854
§ 371 (c)(1),
(2) Date: Apr. 18, 2023

(87) PCT Pub. No.: WO2022/086239
PCT Pub. Date: Apr. 28, 2022

(65) Prior Publication Data
US 2024/0031066 A1 Jan. 25, 2024

(30) Foreign Application Priority Data

Oct. 22, 2020 (IN) .............................. 202041046159
Sep. 27, 2021 (IN) .............................. 202041046159

(51) Int. Cl.
*H04W 36/00* (2009.01)
*H04L 1/1607* (2023.01)
(Continued)

(52) U.S. Cl.
CPC .......... *H04L 1/1657* (2013.01); *H04L 1/1858* (2013.01); *H04W 36/0007* (2018.08); *H04L 2001/0093* (2013.01); *H04W 80/02* (2013.01)

(58) Field of Classification Search
None
See application file for complete search history.

(56) References Cited

U.S. PATENT DOCUMENTS

| 10,582,556 B2 | 3/2020 | Wu |
| 2015/0304378 A1 | 10/2015 | Bi et al. |
(Continued)

FOREIGN PATENT DOCUMENTS

CN 106233815 6/2019

OTHER PUBLICATIONS

PCT/ISA/210 Search Report issued on PCT/KR2021/014854, dated Jan. 21, 2022, pp. 4.

(Continued)

*Primary Examiner* — Anh Vu H Ly
(74) *Attorney, Agent, or Firm* — The Farrell Law Firm, P.C.

(57) ABSTRACT

The present disclosure relates to a 5G communication system or a 6G communication system for supporting higher data rates beyond a 4G communication system such as long term evolution (LTE). Embodiments herein disclose methods for handling lossless operations for a MBS in a wireless communication network (1000). The method includes receiving, by a network entity (200), a PDCP status report from a UE (100). The PDCP status report includes missing PDU. The missing PDU is detected during at least one of a MBS bearer type change, a MBS data transfer and a handover procedure involving a MBS bearer. Further, the method includes determining, by the network entity (200), a PDCP PDU for retransmission of the missing PDU. Further, (Continued)

the method includes retransmitting, by the network entity (200), the determined PDCP PDU to the UE (100) over a PTP path. The method can be used to is enable reliability with efficient retransmission during a PTM-PTP switching, a handover and a normal operation for a NR MBS. Based on the proposed method, a UE MBS service reception performance is enhanced.

13 Claims, 14 Drawing Sheets

(51) Int. Cl.
*H04L 1/1829* (2023.01)
*H04L 1/00* (2006.01)
*H04W 80/02* (2009.01)

(56) References Cited

U.S. PATENT DOCUMENTS

| | | | |
|---|---|---|---|
| 2022/0303730 A1* | 9/2022 | Xu | H04L 1/1642 |
| 2023/0110505 A1* | 4/2023 | Wang | H04L 1/08 |
| | | | 370/331 |
| 2023/0246975 A1* | 8/2023 | Zhang | H04L 1/1848 |
| | | | 370/328 |
| 2023/0389049 A1* | 11/2023 | Kim | H04W 4/06 |
| 2024/0064591 A1* | 2/2024 | Babaei | H04W 36/0088 |

OTHER PUBLICATIONS

PCT/ISA/237 Written Opinion issued on PCT/KR2021/014854, dated Jan. 21, 2022, pp. 5.
Indian Examination Report dated May 9, 2022 issued in counterpart application IN 202041046159, pp. 5.
MediaTek Inc., "Scenarios and Requirements for Mobility with Service Continuity", 3GPP TSG-RAN WG2 Meeting #111 electronic R2-2006827 Online, Aug. 17-28, 2020, pp. 8.
Vivo "MBS Service Continuity for RRC Connected UE", 3GPP TSG-RAN WG2 Meeting #111 electronic R2-2007035 E-Meeting, Aug. 17-28, 2020, pp. 9.
Ericsson, "Mobility for NR MBS", 3GPP TSG-RAN WG2 #111e R2-2007628 Electronic meeting, Aug. 17-28, 2020, pp. 6.
Futurewei, "Support MBS service continuity during mobility", 3GPP TSG-RAN WG2 Meeting #111e R2-2007552 E-Conference, Aug. 17-28, 2020, pp. 7.

* cited by examiner

METHOD AND SYSTEM FOR HANDLING LOSSLESS OPERATIONS FOR MBS IN 5G COMMUNICATION NETWORK

CROSS-REFERENCE TO RELATED APPLICATIONS

This application is a U.S. National Phase Entry of PCT International Application No. PCT/KR2021/014854, which was filed on Oct. 21, 2021, and claims priority to Indian Provisional Patent Application No. 20/204,1046159 and Indian patent application Ser. No. 20/204,1046159, which were filed in the Indian Intellectual Property Office on Oct. 22, 2020, and Sep. 27, 2021, respectively, the entire disclosure of each of which is incorporated herein by reference.

TECHNICAL FIELD

Embodiments disclosed herein relate to a Fifth Generation (5G) communication network, and more particularly to methods and systems for handling lossless operations for a Multicast Broadcast Service (MBS) in the 5G communication network.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems. 6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collison avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mecahnisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

A 5G New Radio (i.e., 5G NR) is targeting support for Multicast and Broadcast services (MBS) in its Release 17 version of specification being prepared by a 3rd Generation Partnership Project (3GPP). In legacy systems, MBMS (Multimedia Broadcast Multicast Services) were supported in a LTE 4G (Long Term Evolution) wireless systems. However, the architecture and the requirements of 5G Multicast Broadcast Services (MBS) could be very different and there is an effort in the direction of designing the architecture for a network as well as a User Equipment (UE) that is in progress.

Specifically, multicast services refer to services being transmitted and availed by a set of UEs registered to a group e.g. MCPTT (Mission Critical Push-To-Talk) service. The broadcast services refer to services being transmitted and available to all the UEs in a specific coverage area where broadcast is performed and typically, the UE may not need to be registered (e.g. Television channel services). Therefore, effectively, both multicast and broadcast services are PTM (Point-To-MultiPoint) services as there is one transmitter and multiple recipient of contents. It is also possible to provide multicast and broadcast services in a PTP (Pointto-Point) manner, wherein there are multiple PTP connections to share the same MBS services with multiple recipients. Apart from multicast and broadcast services, there are another category of services termed as unicast services which is meant for one recipient only and for this there is one to one dedicated connection between transmitter and receiver. Multicast and broadcast services are primarily downlink and therefore, transmitter is typically the network node (e.g. gNB) and receiver is UE or a group of UEs.

It is possible for the PTM bearer, the PTP bearer or a combination of the PTM and PTP bearers to carry the same MBS service. The combination of the PTM and PTP bearers may provide a lot of features with respect to increased reliability of reception of MBS service packets, efficient switching between these two modes of reception when needed; e.g., because of mobility, network loading conditions or based on the user request density for the reception of the MBS service and accordingly, the network may decide the delivery modes to employ and/or switching across delivery modes. A bearer configuration is referred herein, which has possibly both legs of PTM and PTP and is termed as MBS split bearer.

DISCLOSURE OF INVENTION

Technical Problem

The principal object of the embodiments herein is to disclose methods and systems for enabling lossless operations for multicast/broadcast services in a 5G network.

Another object of the embodiments herein is to avoid unnecessary duplication and retransmission and keeping PDCP sequence number (SN) in sync on a PTM path and a PTP path.

Another object of the embodiments herein is to maintain PDCP SN in sync during handover from a source network entity to a target network entity.

Another object of the embodiments herein is enable reliability with efficient retransmission during a PTM-PTP switching, a handover and a normal data transfer operation for a NR MBS. Based on the proposed method, a UE MBS service reception performance is enhanced. The user experience is enhanced and smooth service continuity is ensured.

Solution to Problem

Accordingly, the embodiments herein disclose methods for handling lossless operations for a MBS in a 5G communication network. The method includes receiving, by a network entity, a Packet Data Convergence Protocol (PDCP) status report from a UE. The PDCP status report includes missing Protocol Data Unit (PDU) information. The missing PDU is detected during at least one of a MBS bearer type change, a MBS data transfer and a handover procedure involving a MBS bearer. Further, the method includes determining, by the network entity, a PDCP PDU for retransmission based on the missing PDU in the received PDCP status report. Further, the method includes retransmitting, by the network entity, the determined PDCP PDU to the UE over a Point-to-Point (PTP) path for MBS bearer.

In an embodiment, the method further includes sending, by the network entity, a RRC reconfiguration message to the UE. Further, the method includes adding, by the network entity, a PTP path between the network entity and the UE based on the RRC reconfiguration message.

In an embodiment, receiving, by the network entity, the PDCP status report from the UE includes sending, by the network entity, a MBS data to the UE over at least one of a Point-To-MultiPoint (PTM) path, a PTP path and a split bearer path, sending, by the network entity, a radio resource control (RRC) reconfiguration message to the UE, receiving, by the network entity, a RRC reconfiguration complete message from the UE based on the RRC reconfiguration message, and receiving, by the network entity, the PDCP status report from the UE.

In an embodiment, the RRC reconfiguration message comprises at least one of the MBS bearer type change, a delivery mode, a Group Radio Network Temporary Identifier (G-RNTI), a Cell Radio Network Temporary Identifier (C-RNTI), and a Temporary Mobile Group Identifier (TMGI).

In an embodiment, receiving, by the network entity, the PDCP status report from the UE includes receiving, by the network entity, a handover request from another network entity, wherein the another network entity transfers a MBS data to the UE over at least one of a PTM path, a PTP path and a split bearer path, wherein the another network entity is a source network entity and the network entity is a target network entity, sending, by the network entity, a handover response or handover acknowledge message to the another network entity based on the received handover request message from another network entity, receiving, by the network entity, not yet acknowledged PDUs from the another network entity based on the handover response or handover acknowledge message, wherein the another network entity forwards data to the network entity, receiving, by the network entity, the RRC reconfiguration complete message from the UE upon sending a RRC reconfiguration message to the UE from the another network entity, and receiving, by the network entity, a PDCP status report from the UE. The forwarded data are the PDUs not yet acknowledged for the successful reception to the another network entity (source gNB) and therefore, are being forwarded to the network entity (i.e., target gNB). These forwarded PDUs will be provided to the UE (100), for example, based on the PDCP status report received from the UE (100).

In an embodiment, the RRC reconfiguration message comprises at least one of a handover command for the UE, a delivery mode, a G-RNTI, a C-RNTI, TMGI and a Sequence number (SN) adjustment information, and target cell MBS configurations. The target cell MBS configurations information can include supported MBS services by the target network entity related configurations like DRX configurations, delivery mode, PDCP first SN, RLC first SN, SDAP configurations/PDCP configurations/RLC configurations/MAC configurations/PHY configurations, HARQ configurations including retransmission over PTM, retransmission over PTP, HARQ feedback configured/enabled/disabled, BWP configurations, logical channel identities, security configurations etc.

In an embodiment, receiving, by the network entity, a PDCP status report from the UE includes configuring, by the network entity, a MBS status report required parameter with a RRC reconfiguration message, sending, by the network entity, the RRC reconfiguration message comprising the MBS status report required parameter to the UE, and receiving, by the network entity, the PDCP status report from the UE based on the MBS status report required parameter.

In an embodiment, the MBS bearer type change is performed at the network entity, wherein the MBS data transfer is performed at the network entity, and wherein the handover procedure involving the MBS bearer is performed between the network entity and another network entity, wherein the another network entity is a source network entity and the network entity is a target network entity.

Accordingly, the embodiments herein disclose methods for handling lossless operations for a MBS in a 5G communication network. The method includes determining, by a UE, missing PDU. The missing PDU is detected during at least one of a MBS bearer type change, a MBS data transfer and a handover procedure involving a MBS bearer. Further, the method includes generating, by the UE, a PDCP status report comprising the missing PDU. Further, the method includes sending, by the UE, the PDCP status report comprising the missing PDU to a network entity. Further, the method includes receiving, by the UE, the missing PDU retransmission from the network entity, over a PTP path, based on the PDCP status report.

In an embodiment, further, the method includes receiving, by the UE, a RRC reconfiguration message from the network entity. Further, the method includes establishing, by the network entity, a PTP path between the network entity and the UE based on the RRC reconfiguration message.

In an embodiment, sending, by the UE, the PDCP status report comprising the missing PDU to the network entity includes receiving, by the UE, a MBS data from the network entity over at least one of a PTM path, a PTP path and a split bearer path, receiving, by the UE, a RRC reconfiguration message from the network entity, sending, by the UE, a RRC reconfiguration complete message to the network entity based on the RRC reconfiguration message, and sending, by the UE, the PDCP status report to the network entity.

In an embodiment, sending, by the UE, the PDCP status report comprising the missing PDU to the network entity includes receiving, by the UE, a MBS data from another network entity over at least one of a PTM path, a PTP path and a split bearer path, receiving, by the UE, a radio resource control (RRC) reconfiguration message from the another network entity, wherein the UE performs at least one of: releases the PTM path, switches to the PTP path, a Sequence number (SN) adjustment operation, switches from a MRB to Dedicated Radio Bearer (DRB) and performs a hard reset, sending, by the UE, a RRC reconfiguration complete message to the network entity based on the RRC reconfiguration message, wherein a handover procedure is completed between the network entity and the another network entity, and the network entity receives not yet acknowledged PDUs from the another network entity based on the handover procedure, wherein the another network entity forwards data to the network entity, wherein the another network entity is a source network entity and the network entity is a target network entity, and sending, by the UE, the PDCP status report to the network entity. The forwarded data are the PDUs not yet acknowledged for the successful reception to the another network entity (source gNB) and therefore, are being forwarded to the network entity (i.e., target gNB). These forwarded PDUs will be provided to the UE (100), for example, based on the PDCP status report received from the UE (100).

In an embodiment, the SN adjustment information modifies a PDCP reordering window as and when a RX_DELIV and a RX_NEXT is incremented or decremented, wherein the SN adjustment information is obtained by a usage pattern of the UE, a usage pattern of the another network entity, and a usage pattern of the network entity.

In an embodiment, the SN adjustment information is provided in the RRC reconfiguration message, wherein the SN adjustment information is needed to be applied to the PDCP status report which is to be sent after the handover procedure to the network entity.

In an embodiment, the hard reset is performed when the another network entity and the network entity are not synchronized for a PDCP SN and data forwarding, and PDCP status report procedure is not applied, so as to release a MRB bearer, wherein the RRC reconfiguration message does not provide SN adjustment information. The RRC reconfiguration may include an indication for the hard reset.

In an embodiment, the switching from the MRB to the DRB is performed when the another network entity and the network entity are not synchronized for PDCP SN, wherein the RRC reconfiguration message does not provide SN adjustment information. This further involves releasing of MRB and an addition of DRB before or during the handover procedure.

In an embodiment, sending, by the UE, the PDCP status report comprising the missing PDU to the network entity includes receiving, by the UE, a RRC reconfiguration message comprising a MBS status report required parameter from the another network entity, and sending, by the UE, the PDCP status report to the network entity based on the MBS status report required parameter.

In an embodiment, the PDCP status report is sent when at least one of a reordering timer is expired, a periodic status report timer is expired, a PDCP PDU sequence number gap is determined and a periodic status prohibit timer is expired or not running for the concerned MBS session in the UE, wherein at least one of the reordering timer, the periodic status report timer, and the periodic status prohibit timer is configured per MBS session, wherein the UE comprises one or more MBS session concurrently being received.

In an embodiment, the PDCP layer indicates to a RLC layer to move RLC receive window once a RX_DELIV of a PDCP window is updated, such that a PTP RLC updates state variables and reports updated RLC status report to a peer RLC layer, so as to avoid undesired transmission and retransmission on the PTP path.

In an embodiment, the MBS bearer type change is performed at the network entity, wherein the MBS data transfer is performed at the network entity, and wherein the handover procedure involving the MBS bearer is performed between the network entity and another network entity, wherein the another network entity is a source network entity and the network entity is a target network entity.

Accordingly, the embodiments herein disclose a network entity for handling lossless operations for a MBS in a 5G communication network. The network entity includes a PDCP status report based MBS controller coupled with a processor and a memory. The PDCP status report based MBS controller is configured to receive a PDCP status report from a UE. The PDCP status report includes missing PDU, wherein the missing PDU is detected during at least one of a MBS bearer type change, a MBS data transfer and a handover procedure involving a MBS bearer. Further, the PDCP status report based MBS controller is configured to determine a PDCP PDU for retransmission of the missing PDU. Further, the PDCP status report based MBS controller is configured to retransmit the determined PDCP PDU to the UE over a Point-to-Point (PTP) path for the MBS bearer.

Accordingly, the embodiments herein disclose a UE for handling lossless operations for a MBS in a 5G communication network. The UE includes a PDCP status report based MBS controller coupled with a processor and a memory. The PDCP status report based MBS controller is configured to determine missing PDU, wherein the missing PDU is detected during at least one of a MBS bearer type change, a MBS data transfer and a handover procedure involving MBS bearer. Further, the PDCP status report based MBS controller is configured to generate a PDCP status report comprising the missing PDU. The PDCP status report based MBS controller is configured to send the PDCP status report comprising the missing PDU to a network entity. The PDCP status report based MBS controller is configured to receive the missing PDU retransmission from the network entity, over a PTP path, based on the PDCP status report.

These and other aspects of the embodiments herein will be better appreciated and understood when considered in conjunction with the following description and the accompanying drawings. It should be understood, however, that the following de-scriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which.

MODE FOR THE INVENTION

The embodiments herein and the various features and advantageous details thereof are explained more fully with reference to the non-limiting embodiments that are illustrated in the accompanying drawings and detailed in the following description. De-scriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for handling the lossless operations for a MBS in a 5G communication network. The method includes receiving, by a network entity, a Packet Data Convergence Protocol (PDCP) status report from a User Equipment (UE). The PDCP status report includes missing Protocol Data Unit (PDU) information. The missing PDU is detected during at least one of a MBS bearer type change, a MBS data transfer and a handover procedure involving a MBS bearer. Further, the method includes determining, by the network entity, a PDCP PDU for retransmission of the missing PDU. Further, the method includes retransmitting, by the network entity, the determined PDCP PDU to the UE over a Point-to-Point (PTP) path.

Unlike conventional methods, the proposed method can be used to handle the lossless operations for the MBS in the 5G communication network. The method can be used to enable reliability with efficient retransmission during the PTM-PTP switching, the handover and the normal data transfer operation for NR MBS. Based on the proposed method, the UE MBS service reception performance is enhanced. The user experience is enhanced and smooth service continuity is ensured. The method can be used to avoid unnecessary duplication and retransmission and keeping PDCP SN in sync on the PTM and PTP paths.

In the normal data transfer scenario, when there is a loss of PDU e.g. due to poor channel conditions, and for increased reliability, a PDCP based status reporting can be applied. For bearer type change and handover, there can be interruption when moving from old configuration to new configuration and causing a potential loss of packets or out of order sequenced number PDUs reception, the PDCP based status reporting can be applied.

Figure 2:
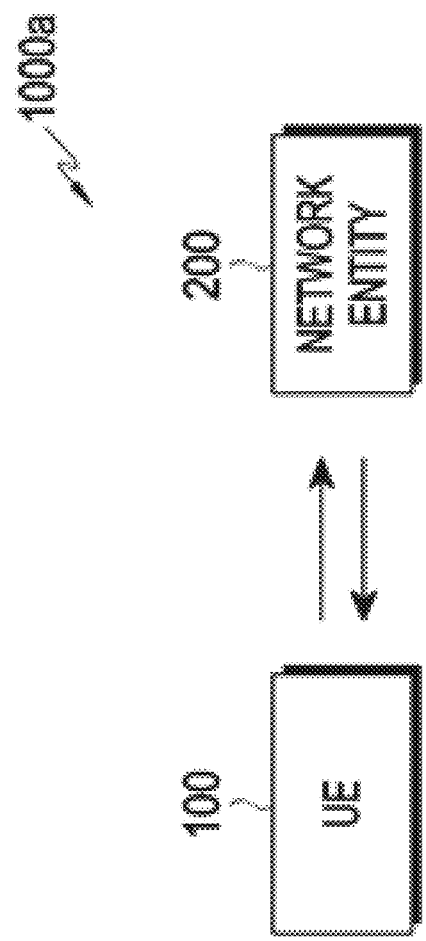
FIG. 2 is an overview of a 5G communication network for handling lossless operations for the MBS, according to embodiments as disclosed herein.
Figure 14:
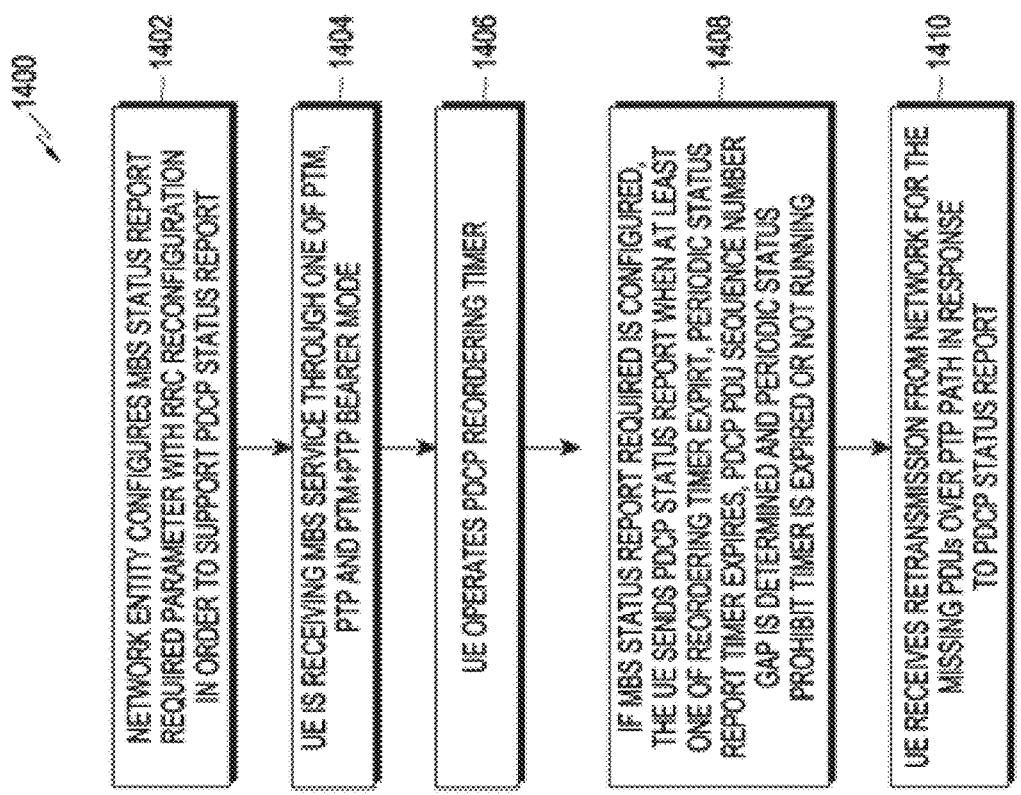
FIG. 14 is a flow chart illustrating a method for handling the lossless operations for the MBS in the 5G communication network, according to embodiments as disclosed herein.

Referring now to the drawings, and more particularly to FIG. 2, to FIG. 14, where similar reference characters denote corresponding features consistently throughout the figures, there are shown at least one embodiment.

Figure 1:
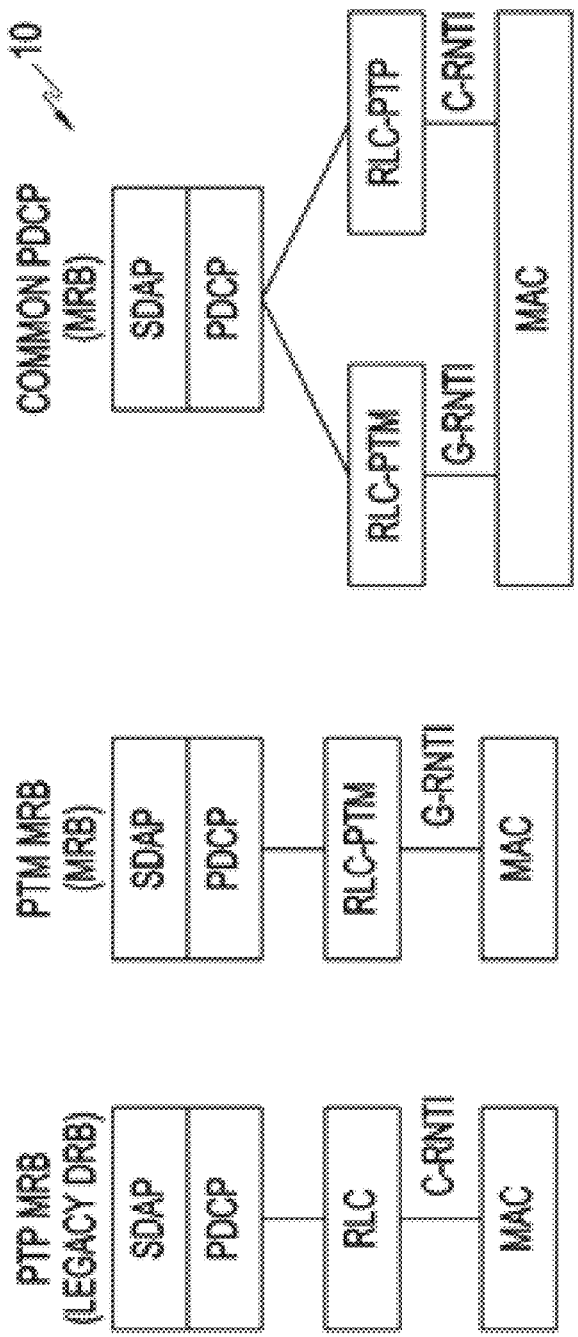
FIG. 1 depicts an architecture for a protocol stack for a UE implementation supporting MBS services.

FIG. 1 depicts the architecture (10) for the protocol stack for a UE (100) implementation supporting the MBS services. Mainly, three types of radio bearer architecture are shown, and are as follows.

a) PTP RLC bearer based (PTP MRB),
b) PTM RLC bearer based (PTM MRB), and
c) PTM+PTP RLC bearers based (MBS split bearer)

The RLC PTM can be based UM (Unacknowledged Mode) RLC, which does not support functionality of ARQ (Automatic Repeat Request) i.e. no RLC level retransmissions are supported as there is no feedback or status report between a transmitting RLC entity and a receiving RLC entity. Whereas, the RLC PTP can be either UM mode or AM (Acknowledged Mode) RLC. AM RLC supports status/feedback sharing from receiver to transmitter, and retransmission of NACKed RLC packets from a transmitter to a receiver. Thereby, there is a further enhancement in the reliability that can be ensured with the AM RLC layer. Effectively, there is a lossless operation that is achieved with utilizing AM RLC mode.

A PDCP layer performs reordering operation and employs a reordering timer t-Reordering to ensure the out of order packets received from RLC (from two RLCs in MBS split bearer) are re-arranged in order of their sequence numbers (SN) before expiry of reordering timer t-Reordering. In case reordering timer expires, and there is still a gap with PDCP receive window (i.e. missing a PDCP PDU SN so that reordering and in-sequence delivery could not be done to the higher layer), PDCP moves it's receive window (i.e. update its state variable RX_DELIV) further and performs the delivery of PDCP PDUs received until window's lower edge, RX_DELIV (of course gap of missing PDCP PDU SN is also delivered).

Having a MBS split bearer with both PTM RLC and PTP RLC bearer adds to the reliability of the MBS bearer as lossless operation is achieved from the PTP path where as PTM path provides the packet with lesser delay as no retransmission is involved albeit with possible loss. With combining these two paths through the PDCP reordering operation, there is higher chances of receiving PDCP PDUs before t-Reordering expiry and providing ordered in-sequence delivery to the higher layer. FIG. 2 is an overview of a 5G communication network (1000a) for handling the lossless operations for the MBS, according to embodiments as disclosed herein. In an embodiment, the 5G communication network (1000a) includes a UE (100) and a network entity (200). The UE (100) can be, for example, but not limited to a laptop, a desktop computer, a notebook, a relay device, a vehicle to everything (V2X) device, a smartphone, a tablet, an internet of things (IoT) device, a Television with communication facility, an immersive device, a virtual reality device, a foldable device or the like. The network entity (200) may also include or be referred to by those skilled in the art as a base station, a base transceiver station, a radio base station, an access point, a radio transceiver, an eNB, a gNodeB (gNB), 6G base station or the like.

As shown in the FIG. 2, the network entity (200) transfers the MBS data to the UE (100) over one of a PTM, a PTP, and a PTM+PTP (i.e., split bearer path). Further, the network entity (200) sends the RRC reconfiguration message to the UE (100). The RRC reconfiguration message includes at least one of a MBS bearer type change, a delivery mode, a G-RNTI, a C-RNTI, a TMGI, and other configurations. The other configurations can be, for example, but not limited to the DRX configurations, PDCP first SN, RLC first SN, SDAP/PDCP/RLC/MAC/PHY configurations, HARQ configurations including retransmission over PTM, retransmission over PTP, HARQ feedback configured/enabled/disabled, BWP configurations, logical channel identities etc. After receiving the RRC reconfiguration message at the UE (100), the UE (100) determines the missing PDUs and/or generates the PDCP status report based on the missing PDU. Further, the UE (100) sends the RRC reconfiguration complete message to the network entity (200). Further, the UE (100) sends the PDCP status report to the network entity (200), where the PDCP status report includes the missing PDUs information. Further, the network entity (200) determines the PDCP PDU for retransmission based on the PDCP status report. Further, the network entity (200) retransmits the determined PDCP PDU to the UE (100) over the PTP path based on the determination.

Figure 3:
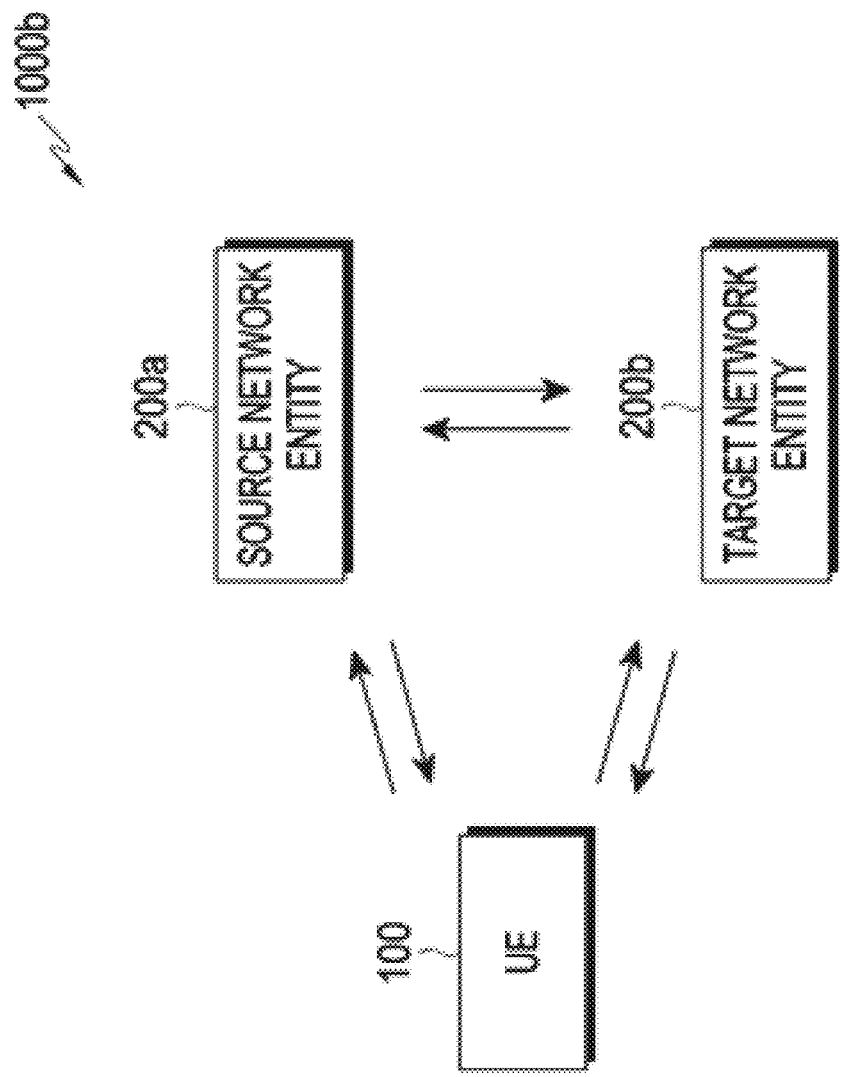
FIG. 3 is another overview of the 5G communication network for handling lossless operations for the MBS, according to embodiments as disclosed herein.

FIG. 3 is another overview of the 5G communication network (1000b) for handling the lossless operations for the MBS, according to embodiments as disclosed herein. In an embodiment, the 5G communication network (1000b) includes the UE (100), a source network entity (200a) and a target network entity (200b). The source network entity (200a) may also include or be referred to by those skilled in the art as a source base station, a source base transceiver station, a source radio base station, a source access point, a source radio transceiver, a source eNB, a source gNodeB (gNB), or the like. The target network entity (200b) may also include or be referred to by those skilled in the art as a target base station, a target base transceiver station, a target radio base station, a target access point, a target radio transceiver, a target eNB, a target gNodeB (gNB), or the like.

In an embodiment, the source network entity (200a) sends the MBS data to the UE (100) over the PTM/the PTP/the PTM+PTP. Further, the source network entity (200a) sends the handover request to the target network entity (200b). Based on the handover request, the target network entity (200b) sends the handover response or handover acknowledge to the source network entity (200a). Further, the source network entity (200a) sends the RRC reconfiguration message to the UE (100). In an embodiment, the RRC reconfiguration message includes the handover command, the delivery mode, the G-RNTI, the C-RNTI, the TMGI, and other configurations. The other configurations can be, for example, but not limited to the DRX configurations, PDCP first SN, RLC first SN, SDAP configurations, PDCP configurations, RLC configurations, MAC configurations, PHY configurations, HARQ configurations including retransmission over PTM, retransmission over PTP, HARQ feedback configured/enabled/disabled, BWP configurations, logical channel identities etc. Based on the RRC reconfiguration message, the UE (100) releases the PTM path and/or switches to PTP path. Further, the source network entity (200a) forwards the data and sends the not yet acknowledged PDUs to the target network entity (200b).

In an embodiment, upon the RRC reconfiguration message reception for at least one of MBS bearer type change, the MBS data transfer (e.g. activation and/or deactivation PTM reception path) and handover involving MBS bearer, the UE (100) initializes the PTM PDCP state variables such that the SN part of the COUNT (Count includes Hyper Frame number (HFN) and Sequence number (SN)) is set to the SN of the first received packet by the UE (100) and the HFN is indicated by the gNB in the RRC reconfiguration message. The PTM RLC state variables RX_Next_Highest and RX_Next_Ressembly are set according to the SN of the first received RLC PDU containing the SN. The PTP RLC state variables for reception window is set to 0. That is, for UM PTP receiving RLC entity RX_Next_Highest and RX_Next_Ressembly and for AM PTP receiving RLC entity RX_Next_Highest and RX_Next are set to 0.

In another embodiment, the RRC reconfiguration message carries the at least one of first SN for the received PDCP PDU for PDCP entity and first SN for the received RLC PDU for the at least one of PTM RLC/UM PTP RLC/AM PTP RLC entities.

In another embodiment, HFN is not indicated in the RRC reconfiguration message and is derived by the UE (100).

Further, the UE (100) sends the RRC reconfiguration complete message to the target network entity (200b). Further, the UE (100) determines the missing PDUs and/or generates the PDCP status report. Further, the UE (100) sends the PDCP status report to the target network entity (200b). Further, the target network entity (200b) determines the PDCP PDU for retransmission based on the PDCP status report. Further, the target network entity (200b) retransmits the determined PDCP PDU to the UE (100) over the PTP path. Further, the target network entity (200b) sends the RRC reconfiguration message to the UE (100) and adds the PTP path between the target network entity (200b) and the UE (100) based on the RRC reconfiguration message.

During the handover, it can be PTP to PTP handover. If there is no PTP path, then source network entity (200a) can add a PTP or switch to PTP before/during the handover procedure.

In another embodiment, the RRC reconfiguration message includes the handover command, the delivery mode, the G-RNTI, the C-RNTI, the TMGI, the SN adjustment information and target cell MBS configurations. The target cell MBS configurations information can include supported MBS services by target network entity related configurations like DRX configurations, delivery mode, PDCP first SN, RLC first SN, SDAP configurations, PDCP configurations, RLC configurations, MAC configurations, PHY configurations, HARQ configurations including retransmission over PTM, retransmission over PTP, HARQ feedback configured/enabled/disabled, BWP configurations, logical channel identities, security configurations etc. Based on the RRC reconfiguration message, the UE (100) releases the PTM path and/or switches to the PTP path. The SN adjustment information is used for updating RX_DELIV and a RX_NEXT and/or receive or reordering window. The SN adjustment information modifies a PDCP reordering window as and when the RX_DELIV and a RX_NEXT is incremented or decremented, In another embodiment, based on the RRC reconfiguration message, the UE (100) releases the PTM path and/or switches to the PTP path. There is no SN adjustment information is provided in the reconfiguration message. The UE (100) uses the stored/book keeping info for target network entity (200b)/cell to determine the SN adjustment information. The SN adjustment information is used for updating RX_DELIV and a RX_NEXT and/or receive or reordering window The SN adjustment information modifies a PDCP reordering window as and when the RX_DELIV and a RX_NEXT is incremented or decremented.

Based on the RRC reconfiguration message, the UE (100) performs the hard reset and releases MRB. Further, the UE (100) performs the unicast handover. The RRC reconfiguration may include an indication for the hard reset.

In an embodiment herein, the PDCP status report is utilized to avail retransmission of the PDCP PDUs which are missed. In an embodiment, the UE (100) receives the MBS service on source cell/gNB when undergoes handover and on the target cell, the UE (100) transmits the PDCP status report as a first uplink PDU on the PTP path to inform the target cell/gNB on the reception status of the PDCP PDUs. More specifically the PDCP status report carries the FMS (first missing Sequence number) for the PDCP PDU which is not yet received successfully by the PDCP and a bitmap indicating the received or not received PDCP PDU SN following the FMS. Based on the PDCP status report, a transmitting entity on the target cell/gNB will conduct retransmissions on the PTP path of the PDCP PDUs that are indicated as missing.

Further, during mobility if there is PDCP SN synchronization is not there in a source cell/gNB and a target cell/gNB (i.e. actual PDCP SDU contents belong to different PDCP SN on source cell/gNB and target cell/gNB), there is an SN adjustment step (i.e. increment or decrement of SN) is applied. The SN adjustment step can be applied to the SN conveyed in the PDCP status report and/or data forwarding and also to the SN next to be received. The SN adjustment is also applied to the PDCP state variables RX_DELIV and a RX_NEXT and so on and to the receiving and/or reordering window. The reordering timer may be stopped and/or restarted. The SN adjustment information is conveyed to the UE (100) beforehand e.g. in the RRC reconfiguration message initiating the handover. As an alternative, the UE (100) also stores or main book-keeping for the different cells/gNBs which are synchronized or not, other details like offsets, SN gaps etc. and utilizes this information when doing mobility like handover or cell reselections.

In an embodiment, a hard reset is performed when the source cell and target cell are not synchronized for PDCP SN and data forwarding and/or PDCP status report procedure is not applied. That is the MRB bearer is released and then setup again on the target cell/gNB.

In an embodiment, an indication on support for MBSFN (MBMS Single Frequency Network) and/or some or different MBSFN area identity on the target cell/gNB is provided in the handover message (e.g. RRC reconfiguration message) on the source cell/gNB.

In an embodiment, the PDCP status reporting mechanism is deployed when there is switching between bearer types or delivery modes as at least one of
  a. PTP to PTP,
  b. PTM to PTP,
  c. PTM to PTP+PTM,
  d. PTP to PTM+PTP, and
  e. PTM+PTP to PTP.

In the switched mode, the PDCP status report is triggered on the PTP path and retransmission is availed for the missing PDCP PDUs. The loss of PDCP PDUs could be before the switching and/or also during switching process wherein some of the transmission are missed by the UE (100).

Further during bearer type switching (or delivery mode switching), it might be possible that PDCP status report conveys acknowledgement for PDUs SN and/or missing status for PDUs SN which were not yet actually transmitted on the new PTP path (as actual transmission timings may differ on PTM and PTP paths due to different DRX/scheduling configurations. In this scenario, the receiver entity for PDCP status report need to selectively ignore the SNs which are not yet processed for transmission.

In an embodiment, the PDCP status report is triggered even during normal reception operation (when there is no mobility or switching operation is taking place) i.e. within the same bearer mode or within the same cell. With PDCP status report, retransmission for the missing PDCP PDUs is availed.

In an embodiment, the PTP path is used for selective transmission/retransmission only of PDCP PDUs i.e. it is not a full-fledged bearer. The PDCP status report is sent on the uplink on PTP bearer to inform peer PDCP entity to transmit/retransmit PDCP PDUs on the PTP path. This way the missing PDCP PDUs with the PTM based reception path are recovered from the selective transmission/retransmission from the PTP path and reliability is enhanced. Moreover, reordering timer on the PTM path can be smaller and hence, quicker status report is sent and transmission/retransmission is availed through PTP path. There are multiple options proposed to control the sending of the PDCP status report on the PTP path.

In an embodiment, multiple triggers are provided to control the PDCP status report sending on the PTP path. One of them is upon Reordering timer expiry and detection of the SN gaps (i.e. missing PDCP PDUs) on the PDCP receive window. To ensure low latency performance reordering timer on the PTM path should be small or delivery of the PDCP SDUs to the higher layer is delayed until transmission/retransmission on the PTP path is availed. Alternatively, method is applied to the delay insensitive services so that large delay can withstand for data delivery.

Other is periodic transmission of the PDCP status report, once periodic timer expires. To avail low latency, periodic timer can be kept small or alternatively, latency is not the issue, large value of the periodic timer can be configured. Additionally, other triggers like detection of PDCP SN gap and/or reordering timer expiry can also be applied along with periodic timer.

In order to avoid undesired multiple PDCP status report quickly, a prohibit timer can also be configured so that there is a stipulated gap between two PDCP status report. Further, there can be a polling from the transmitting PDCP entity which causes the PDCP status report to be sent by the receiving PDCP entity.

In an embodiment, the PDCP status reporting for transmission/retransmission of PDCP PDUs is configured by the gNB. This could be indicated with an information elements or a flag like MBSstatusReportRequired. When this is set or configured, the UE (100) performs the PDCP status reporting procedure for selection transmission/retransmission; otherwise not.

X.Y Status Reporting x.y.1 Transmit Operation

For MRBs configured by upper layers to send a PDCP status report in the uplink on PTP AM RLC (MBSstatusReportRequired), the receiving PDCP entity shall trigger a PDCP status report when at least one of:
  a. The upper layer requests a MBS PDCP entity re-establishment;
  b. The upper layer requests a MBS bearer mode switching;
  c. The upper layer requests a PDCP data recovery
  d. The upper layer requests a data switching
  e. The upper layer requests a PDCP entity reconfiguration and the associated RLC entity is released for the MBS radio bearer
  f. The upper layer requests a MBS PTP bearer for selective transmission/retransmission; and
  g. The upper layer configured triggers are met. These include one or more of:
  I. expiry of reordering timer,
  II. expiry of periodic status timer, and
  III. detection of PDCP SN gap
  IV. receiving a poll for PDCP status report from peer PDCP entity When the PDCP status report is triggered based on upper layer configured triggers, transmission of PDCP status report is allowed when PDCP status prohibit timer is expired.

For MRBs configured by upper layers to send a PDCP status report in the uplink PTP UM RLC (MBSstatusReportRequired in TS 38.331), the receiving PDCP entity shall trigger a PDCP status report when at least one of:
  a. upper layer requests a MBS PDCP entity re-establishment;
  b. upper layer requests a MBS bearer mode switching;
  c. upper layer requests a data switching
  d. upper layer requests a PDCP data recovery
  e. upper layer requests a PDCP entity reconfiguration and the associated RLC entity is released for the MBS radio bearer If a PDCP status report is triggered, the receiving PDCP entity shall:
  if status prohibit timer is not running, compile a PDCP status report as indicated below by:
  a. setting the FMC field to RX_DELIV;
  b. if RX_DELIV<RX_NEXT:
    i. allocating a Bitmap field of length in bits equal to the number of COUNTs from and not including the first missing PDCP SDU up to and including the last out-of-sequence PDCP SDUs, rounded up to the next multiple of 8, or up to and including a PDCP SDU for which the resulting PDCP Control PDU size is equal to 9000 bytes, whichever comes first;
    ii. setting in the bitmap field as '0' for all PDCP SDUs that have not been received, and optionally PDCP SDUs for which decompression have failed;
    iii. setting in the bitmap field as '1' for all PDCP SDUs that have been received;
    iv. submit the PDCP status report to lower layers as the first PDCP PDU for transmission via the transmitting PDCP entity on PTP RLC bearer for Uu interface
    v. start status prohibit timer In an embodiment, the method can be used to ensure PDCP status report is quickly or immediately transmitted on the PTP path on uplink, the logical channel corresponding to the PTP RLC bearer is prioritized. This could be configured by the network with a higher priority. Alternatively, the UE (100) increases the logical channel priority as and when the PDCP status report is to be transmitted. Further, a buffer status report (BSR) and/or a scheduling Request (SR) is triggered to avail an uplink grant to transmit the uplink communication pertaining to PDCP status report on PTP. In case there is a loss of synchronization between the UE (100) and gNB and/or SR reached maximum retransmission count without availing uplink grant and SR resources are not configured, the UE (100) will trigger a random access (RA) procedure.

In an embodiment, the method can be used to increase reliability of the transmission of the PDCP status report, the uplink RLC PDU carrying the PDCP status report is repeated over two or more slots (i.e. duplicated in time domain) or alternatively, it is bundled transmitted over two or more MAC TBs (i.e. repeated over MAC TBs). Further, HARQ transmission is enabled for the uplink PTP path to ensure enhanced reliability.

In an embodiment herein, the switching across the bearer modes (PTP, PTM and PTM+PTP) is applied through MAC signaling (e.g. utilizing MAC CE to indicate the activation and/or deactivation of bearer mode switch). In a proposed approach, activation MAC CE is followed by a deactivation MAC CE with a time gap between the two in order to allow some time for switching without causing the loss of data (i.e. like a Make-Before-Break operation). This way, during switching for a temporary time period both the old and new bearer modes are active and no data loss is happened. In case of duplicate reception on the two bearer modes, duplicate packets are detected and are discarded. MAC CE indicates at least one of TMGI, G-RNTI, C-RNTI, Radio bearer Id and bearer mode type to inform the UE (100) about the bearer mode change or switching between PTP and PTM. Alternatively, it only indicates the activation or deactivation of bearer mode change or switching and other field are determined by the MAC CE presence on the relevant logical channel or bearer or service.

In an embodiment, the dynamic switching is through the RRC signaling (e.g. bearer type change). The signaling indicates at least one of TMGI, G-RNTI, C-RNTI, Radio bearer Id, bearer mode type, MBS configurations (e.g. DRX configurations, SDAP/PDCP/RLC/MAC/PHY configurations, HARQ configurations including retransmission over PTM, retransmission over PTP, HARQ feedback configured/enabled/disabled, BWP configurations, logical channel identities etc.) to inform the UE (100) about the bearer mode change or switching between the PTP, PTM and the PTM+PTP.

In an embodiment, interaction between PDCP and PTP RLC layer is proposed. When there is already reception of the PDCP packets at PDCP through PTM path, undesired reception on PTP path is not needed and causes unnecessary transmission and retransmission on the PTP path when if PTP path has not yet received a RLC PDU (carrying PDCP PDU which is already received through PTM path). This is due to lossless nature of the PTP AM RLC. In this scenario, it is proposed that PDCP indicates to the RLC to move receive window once RX_DELIV of the PDCP window is increased. Thereby PTP RLC also updates its state variables and reports updated status report to the peer RLC entity. Thereby, undesired transmission and/or retransmission on the PTP path is avoided.

The method can be used to avoid unnecessary duplication transmission/retransmission and keeping PDCP SN in sync received from PTM and PTP paths, apply PDCP and PTP RLC interaction e.g. Move Receive Window at RLC when PDCP RX_DELIV is updated (in general or when reordering time expires)
  a. When highest PDCP SN delivered by PTP RLC<RX_DELIV after reordering time expiry, indicate RLC to move receive window by the gap; and/or
  b. When highest in-sequence PDCP SN delivered by PTP RLC<RX_DELIV after reordering timer expiry, indicate RLC to move receive window by the gap.

In an embodiment, the PTP RLC receive window is updated as and when RX_DELIV is incremented by PDCP i.e. when receiving the PDCP PDU through the PTM path that has SN same as first not received PDCP SN. With this approach, waiting for the reordering timer expiry is not required.

X.Y.Z.2 Actions when a t-Reordering Expires

When t-Reordering expires, the receiving PDCP entity shall:
  I. deliver to upper layers in ascending order of the associated COUNT value after performing header decompression, if not decompressed before:
  a. all stored PDCP SDU(s) with associated COUNT value(s)<RX_REORD;
  b. all stored PDCP SDU(s) with consecutively associated COUNT value(s) starting from RX_REORD;
  I. if RX_DELIV is greater than highest PDCP SN delivered by PTP RLC, indicate PTP RLC to move receive window by the gap between the two
  II. update RX_DELIV to the COUNT value of the first PDCP SDU which has not been delivered to upper layers, with COUNT value>=RX_REORD;
  III. if RX_DELIV<RX_NEXT:
  a. update RX_REORD to RX_NEXT;
  b. start t-Reordering.

In an embodiment, during the PTP→PTM & PTP+PTM→PTM transitions, potential of data when handing over to target gNB with only PTM configuration can be reduced or prevented if source gNB provides data in advance over PTP bearer to the UE (100) before handover (when it is available with source gNB but generally not transmitted to PTM DRX scheduling pattern). As an alternative, the source gNB provides data during handover preparation phase over PTP bearer to the UE (100).

In an embodiment, during the PTM→PTP & PTM→PTP+PTM transitions, potential of data when handing over from source gNB with only PTM configuration can be reduced or prevented if source gNB forwards to target gNB data from before than the last tted PDCP SN on PTM). Further, based on PDCP status report on PTP bearer, retransmission for missing PDUs is availed, if As an alternative, the UE (100) avails configuration for the target cell before handover (i.e. handover command message) and starts availing MBS from target cell during handover over PTP/PTM paths.

Figure 4:
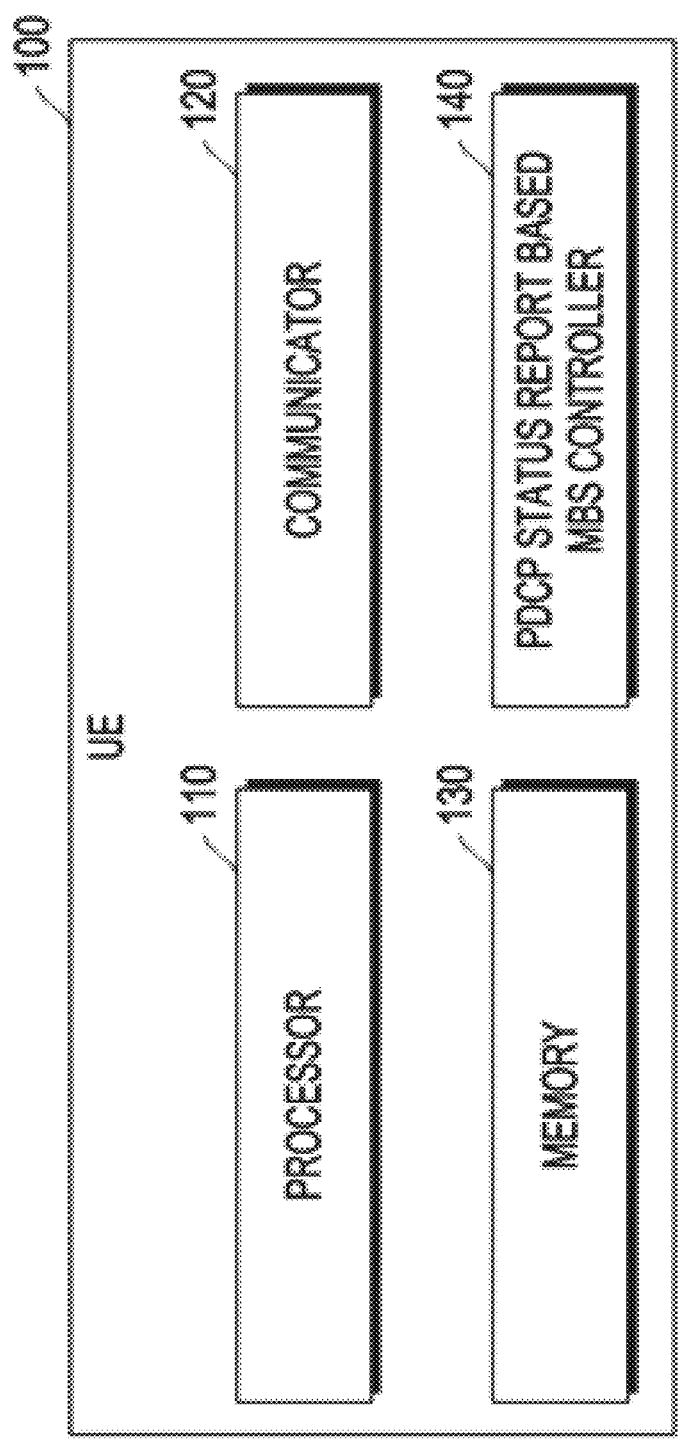
FIG. 4 shows various hardware components of the UE, according to embodiments as disclosed herein.

FIG. 4 shows various hardware components of the UE (100), according to embodiments as disclosed herein. The UE (100) includes a processor (110), a communicator (120), a memory (130) and a PDCP status report based MBS controller (140). The processor (110) is coupled with the communicator (120), the memory (130) and the PDCP status report based MBS controller (140).

The PDCP status report based MBS controller (140) is configured to determine the missing PDU. The missing PDU is detected during at least one of the MBS bearer type change, the MBS data transfer and the handover procedure involving the MBS bearer. Further, the PDCP status report based MBS controller (140) is configured to generate the PDCP status report comprising the missing PDU. Further, the PDCP status report based MBS controller (140) is configured to send the PDCP status report comprising the missing PDU to the network entity (200).

In an embodiment, the PDCP status report comprising the missing PDU is sent to the network entity (200) by receiving a MBS data from the network entity (200) over the PTM path, the PTP path and the split bearer path, receiving a RRC reconfiguration message from the network entity (200), sending the RRC reconfiguration complete message to the network entity (200) based on the RRC reconfiguration message, and sending the PDCP status report to the network entity (200).

In an embodiment, the PDCP status report comprising the missing PDU is sent to the network entity (200) by receiving a MBS data from another network entity (200) over at least one of the PTM path, the PTP path and the split bearer path, receiving the RRC reconfiguration message from the another network entity (200), sending a RRC reconfiguration complete message to the network entity (200) based on the RRC reconfiguration message, and sending the PDCP status report to the network entity (200).

In an embodiment, the PDCP status report comprising the missing PDU is sent to the network entity (200) by receiving a RRC reconfiguration message comprising a MBS status report required parameter from the network entity (200), and sending the PDCP status report to the network entity (200) based on the MBS status report required parameter.

Further, the PDCP status report based MBS controller (140) is configured to receive the missing PDU retransmission from the network entity (200), over the PTP path, based on the PDCP status report. Further, the PDCP status report based MBS controller (140) is configured to receive a RRC reconfiguration message from the network entity (200). Further, the PDCP status report based MBS controller (140) is configured to establish the PTP path between the network entity (200) and the UE (100) based on the RRC reconfiguration message.

The PDCP status report based MBS controller (140) is physically implemented by analog or digital circuits such as logic gates, integrated circuits, microprocessors, mi-crocontrollers, memory circuits, passive electronic components, active electronic components, optical components, hard-wired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in ac-cordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 4 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

Figure 5:
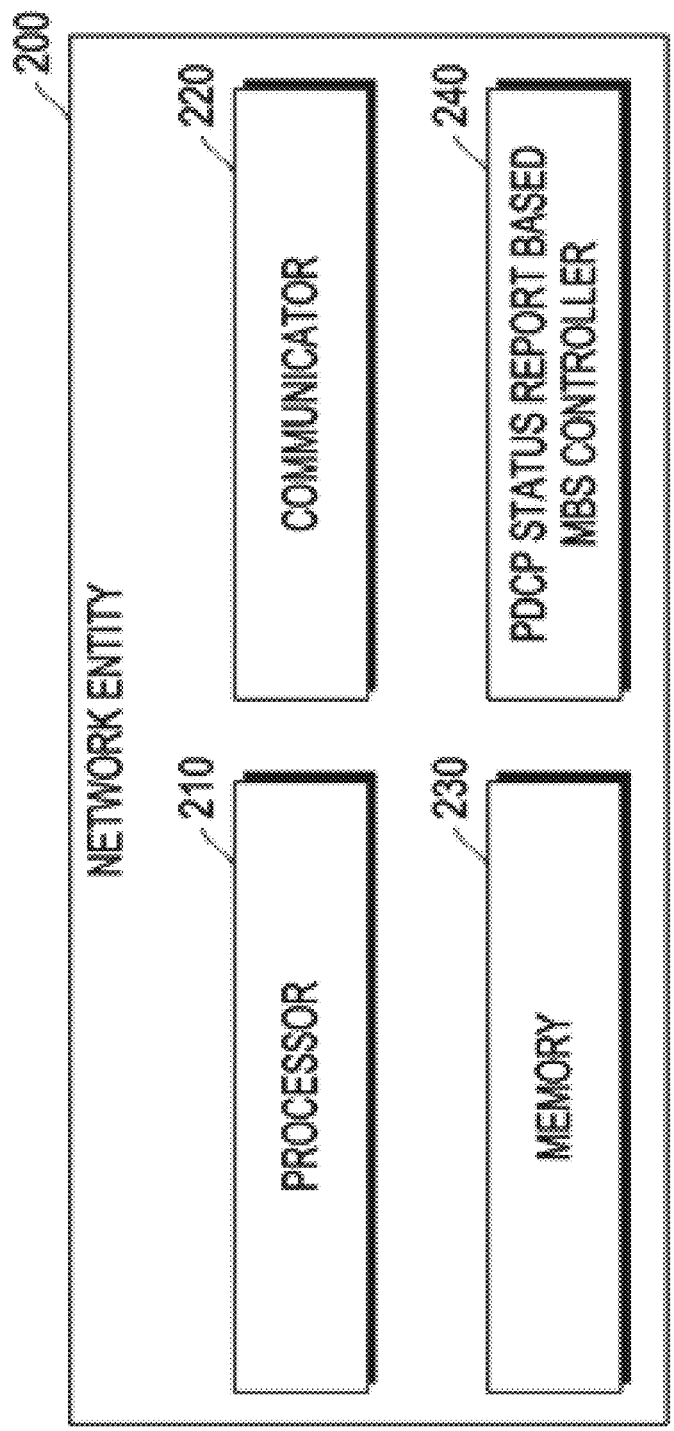
FIG. 5 shows various hardware components of a network entity, according to embodiments as disclosed herein.

FIG. 5 shows various hardware components of the network entity (200), according to embodiments as disclosed herein. The network entity (200) includes a processor (210), a communicator (220), a memory (230) and a PDCP status report based MBS controller (240). The processor (210) is coupled with the communicator (220), the memory (230) and the PDCP status report based MBS controller (240).

The PDCP status report based MBS controller (240) is configured to receive the PDCP status report from the UE (100). The PDCP status report includes missing PDU, where the missing PDU is detected during at least one of the MBS bearer type change, the MBS data transfer and the handover procedure involving the MBS bearer.

In an embodiment, the PDCP status report is received from the UE (100) by sending the MBS data to the UE over at least one of the PTM path, the PTP path and the split bearer path, sending the RRC reconfiguration message to the UE (100), and receiving the RRC reconfiguration complete message from the UE (100) based on the RRC reconfiguration message.

In an embodiment, the PDCP status report is received from the UE (100) by receiving the handover request from another network entity (200a), sending a handover response or handover acknowledge to the network entity (200b) based on the handover request, receiving not yet acknowledged PDUs from the another network entity (200a) based on the handover response, where the another network entity (200a) forwards data to the network entity (200b), receiving the RRC reconfiguration complete message from the UE (100) upon sending a RRC reconfiguration message to the UE (100) from the another network entity (200a), and receiving the PDCP status report from the UE (100). The another network entity (200a) transfers a MBS data to the UE (100) over at least one of the PTM path, the PTP path and the split bearer path. The another network entity (200a) is the source network entity (200a) and the network entity (200b) is the target network entity (200b). The forwarded data are the PDUs not yet acknowledged for the successful reception to the another network entity (source gNB) and therefore, are being forwarded to the network entity (i.e., target gNB). These forwarded PDUs will be provided to the UE (100), for example, based on the PDCP status report received from the UE (100).

In an embodiment, the PDCP status report is received from the UE (100) by configuring a MBS status report required parameter with a RRC reconfiguration message, sending the RRC reconfiguration message comprising the MBS status report required parameter to the UE (100), and receiving the PDCP status report from the UE (100) based on the MBS status report required parameter.

Further, the PDCP status report based MBS controller (240) is configured to determine the PDCP PDU for retransmission of the missing PDU based on the PDCP status report. Further, the PDCP status report based MBS controller (240) is configured to retransmit the determined PDCP PDU to the UE over the PTP path.

Further, the PDCP status report based MBS controller (240) is configured to send the RRC reconfiguration message to the UE. Further, the PDCP status report based MBS controller (240) is configured to add the PTP path between the network entity (200) and the UE (100) based on the RRC reconfiguration message.

The PDCP status report based MBS controller (240) is physically implemented by analog or digital circuits such as logic gates, integrated circuits, microprocessors, mi-crocontrollers, memory circuits, passive electronic components, active electronic components, optical components, hard-wired circuits, or the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in ac-cordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 5 shows various hardware components of the network entity (200) but it is to be understood that other embodiments are not limited thereon. In other embodiments, the network entity (200) may include less or more number of components. Further, the labels or names of the components are used only for illustrative purpose and does not limit the scope of the invention. One or more components can be combined together to perform same or substantially similar function in the network entity (200).

Figure 6:
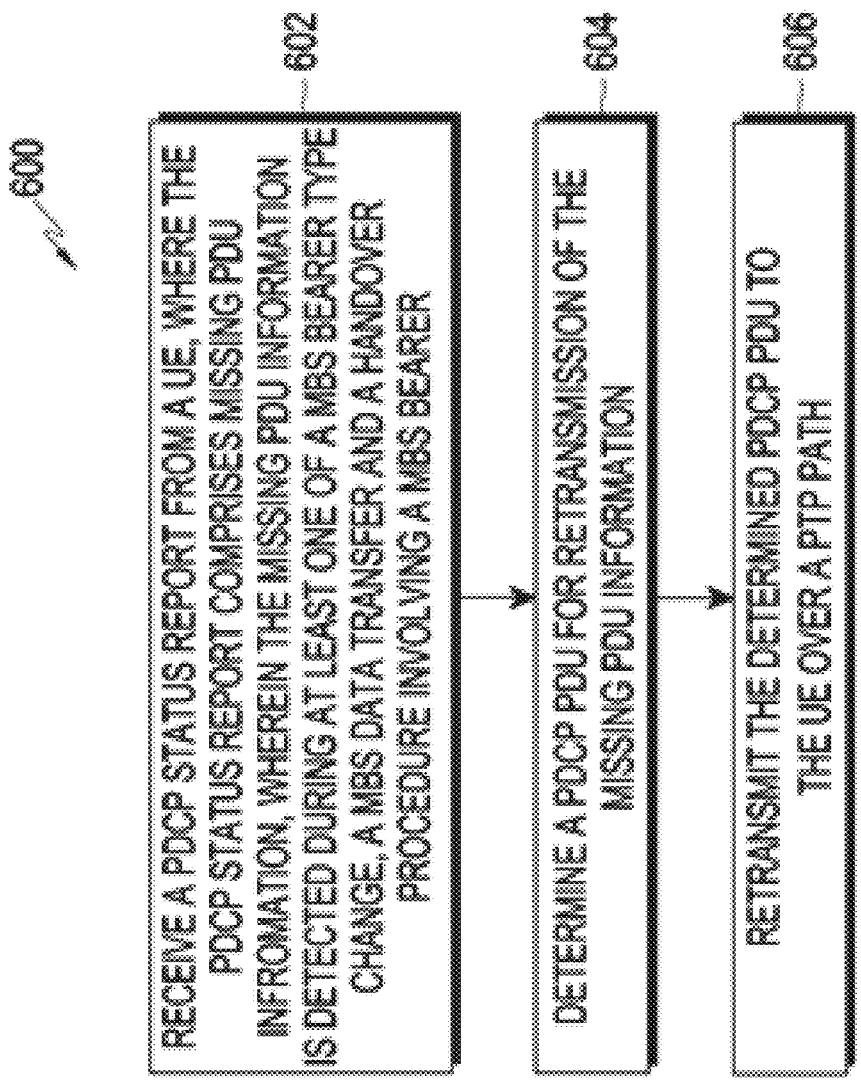
FIG. 6 is a flow chart illustrating a method, implemented by the network entity, for handling the lossless operations for the MBS in the 5G communication network, according to embodiments as disclosed herein.

FIG. 6 is a flow chart (600) illustrating a method, implemented by the network entity (200), for handling the lossless operations for the MBS in the 5G communication network (1000a), according to embodiments as disclosed herein. The operations (602-606) are performed by the PDCP status report based MBS controller (240). At 602, the method includes receiving the PDCP status report from the UE (100).

The PDCP status report includes the missing PDU. The missing PDU is detected during at least one of the MBS bearer type change, the MBS data transfer and the handover procedure involving the MBS bearer. At 604, the method includes determining the PDCP PDU for retransmission of the missing PDU based on PDCP status report. At 606, the method includes retransmitting the determined PDCP PDU to the UE (100) over the PTP path.

Figure 7:
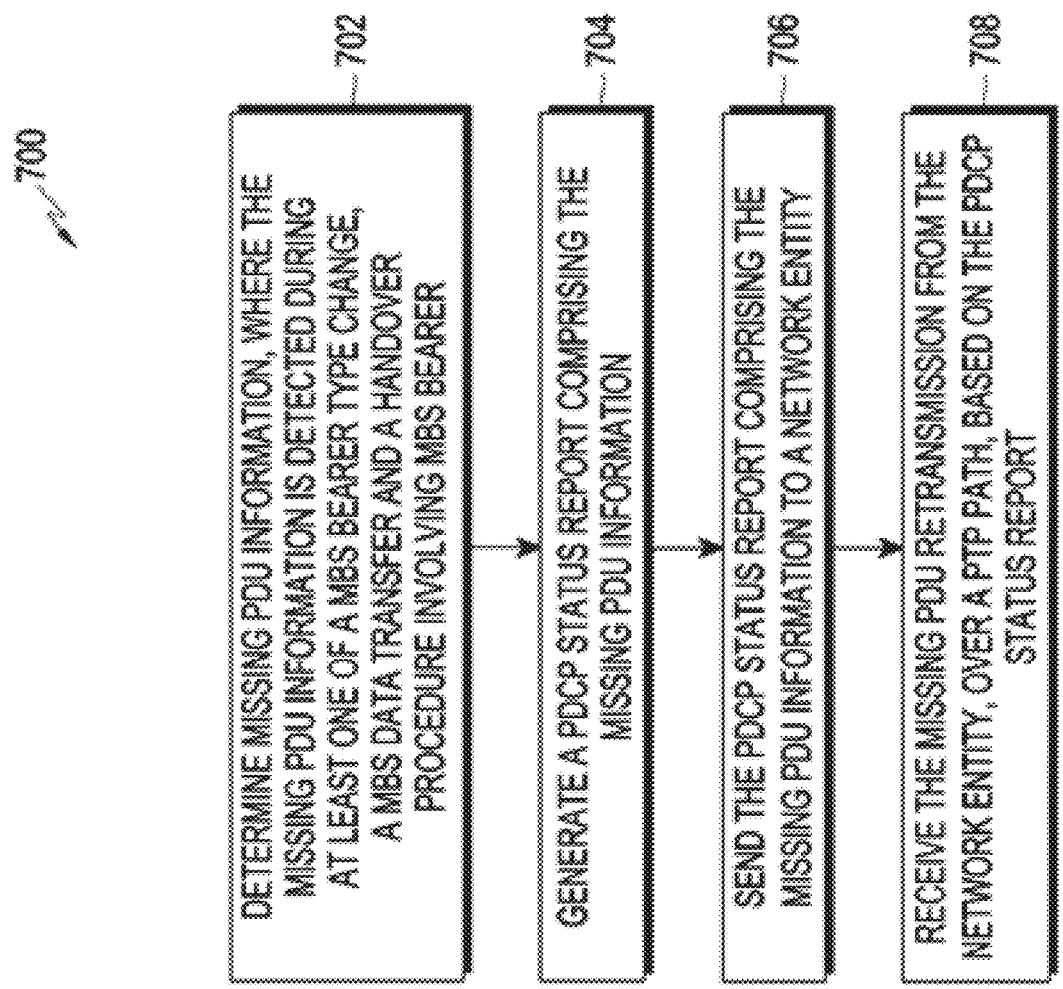
FIG. 7 is a flow chart illustrating a method, implemented by the UE, for handling the lossless operations for the MBS in the 5G communication network, according to embodiments as disclosed herein.

FIG. 7 is a flow chart (700) illustrating a method implemented by the UE (100), for handlingthe lossless operations for the MBS in the 5G communication network (1000b), according to embodiments as disclosed herein. The operations (702-708) are performed by the PDCP status report based MBS controller (140).

At 702, the method includes determining the missing PDU, wherein the missing PDU is detected during at least one of the MBS bearer type change, the MBS data transfer and the handover procedure involving the MBS bearer. At 704, the method includes generating the PDCP status report comprising the missing PDU. At 706, the method includes sending the PDCP status report comprising the missing PDU to the network entity (200). At 708, the method includes receiving the missing PDU retransmission from the network entity (200), over the PTP path, based on the PDCP status report.

Figure 8:
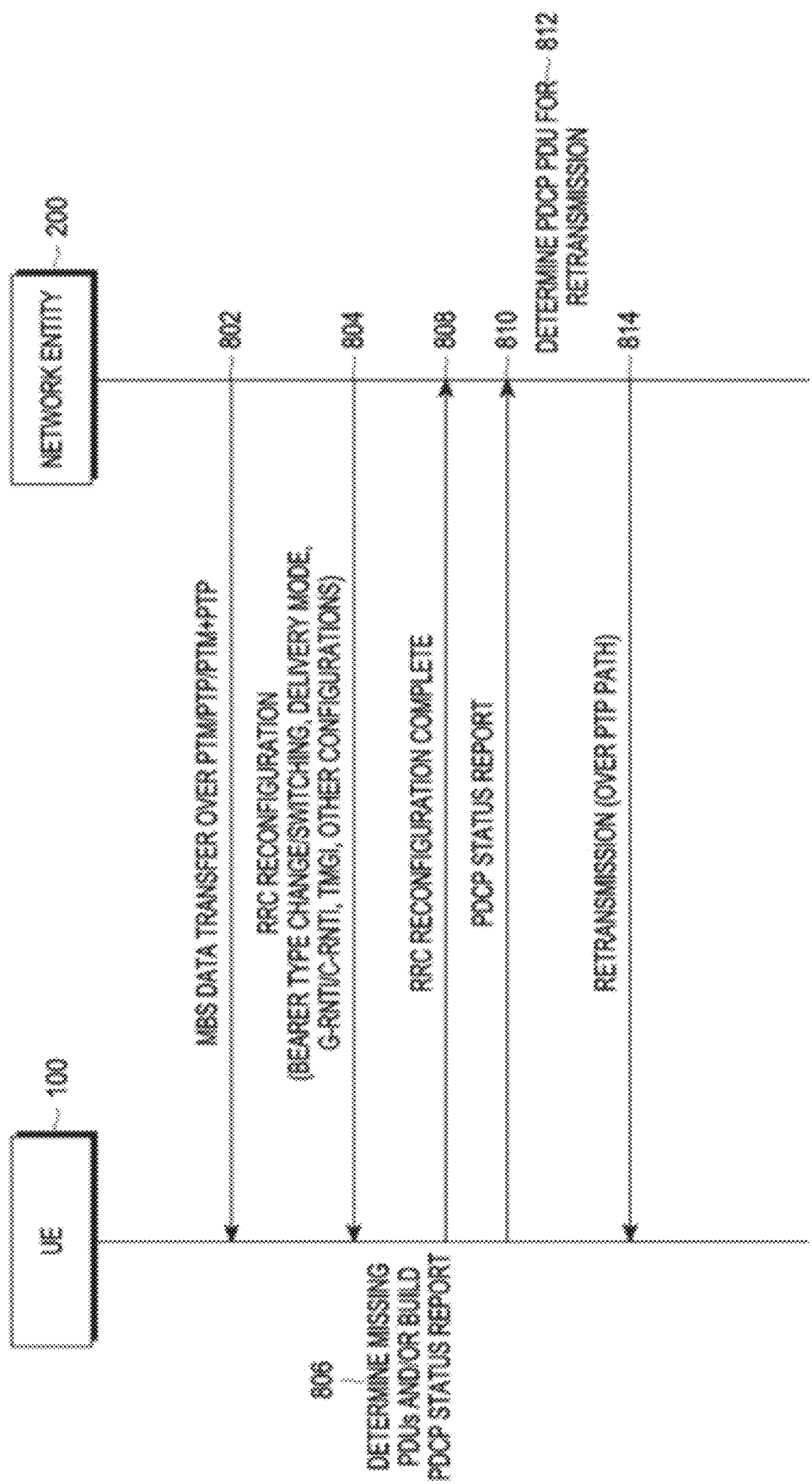
FIG. 8 is a sequence diagram illustrating step by step operations for handling the lossless operations for the MBS in the 5G communication network, according to embodiments as disclosed herein.

FIG. 8 is a sequence diagram illustrating step by step operations for handling the lossless operations for the MBS in the 5G communication network (1000a), according to embodiments as disclosed herein.

At 802, the network entity (200) transfers the MBS data to the UE (100) over the PTM/the PTP/the PTM+PTP. At 804, the network entity (200) sends the RRC reconfiguration message to the UE (100). The RRC reconfiguration message includes at least one of the MBS bearer type change, a delivery mode, the G-RNTI, the C-RNTI, the TMGI, and other configuration. After receiving the RRC reconfiguration message at the UE (100), at 806, the UE (100) determines the missing PDUs and/or builds the PDCP status report based on the missing PDU. At 808, the UE (100) sends the RRC reconfiguration complete message to the network entity (200). At 810, the UE (100) sends the PDCP status report to the network entity (200), wherein the PDCP status report includes the missing PDUs. At 812, the network entity (200) determines the PDCP PDU for retransmission based on PDCP status report. At 814, the network entity (200) retransmits the determined PDCP PDU to the UE (100) over the PTP path based on the determination.

FIG. 9 to FIG. 12 are sequence diagrams illustrating step by step operations for handling the lossless operations for the MBS in the 5G communication network (1000b), according to embodiments as disclosed herein.

Figure 9:
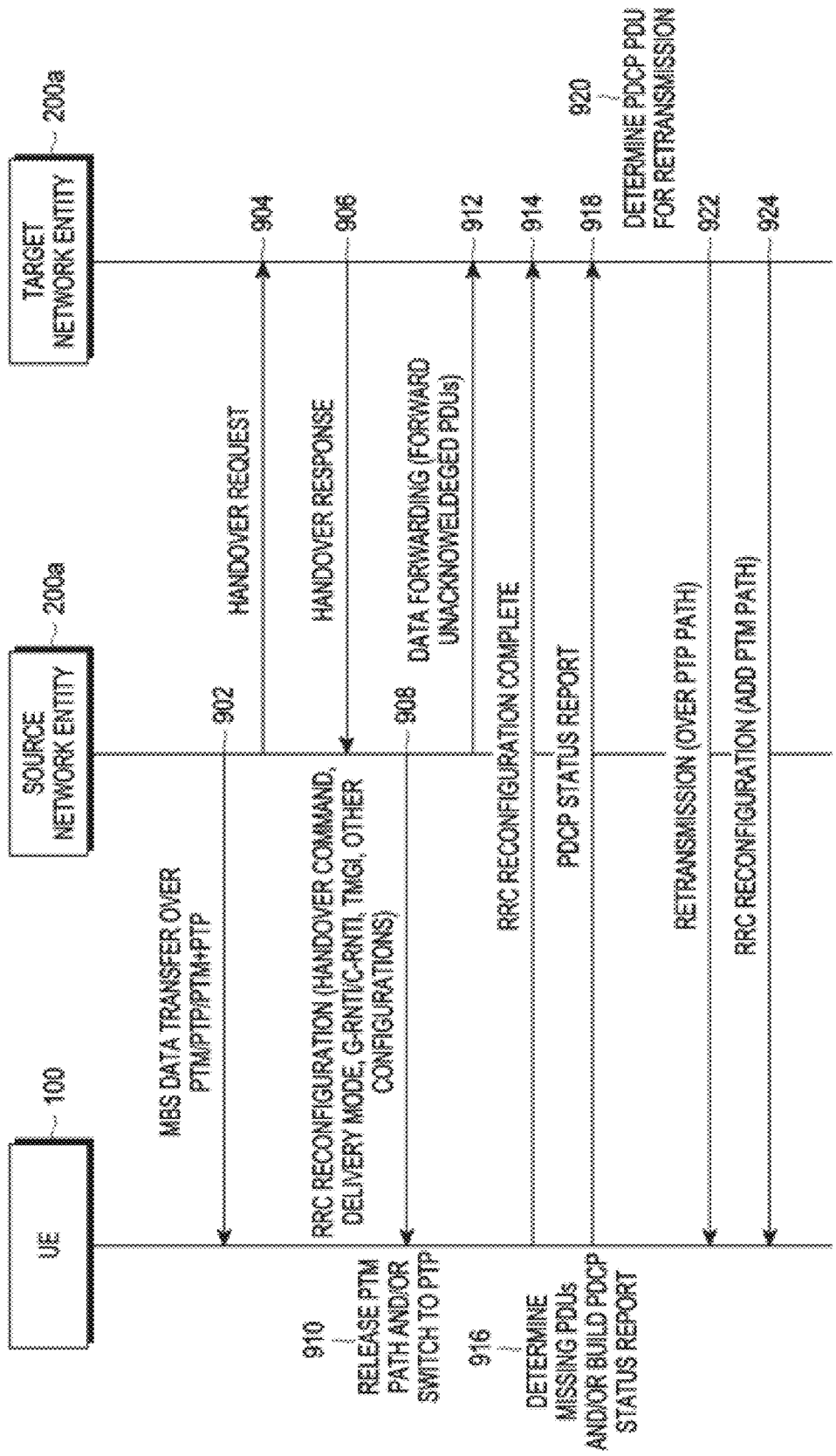
FIG. 9 to FIG. 12 are sequence diagrams illustrating step by step operations for handling the lossless operations for the MBS in the 5G communication network, according to embodiments as disclosed herein.

As shown in the FIG. 9, at 902, the source network entity (200a) sends the MBS data to the UE (100) over PTM/PTP/PTM+PTP. At 904, the source network entity (200a) sends the handover request to the target network entity (200b). At 906, the target network entity (200b) sends the handover response to the source network entity (200a) based on the handover request. At 908, the source network entity (200a) sends the RRC reconfiguration message to the UE (100). The RRC reconfiguration message includes the handover command, the delivery mode, the G-RNTI, the C-RNTI, the TMGI, and other configurations. Based on the RRC reconfiguration message, at 910, the UE (100) releases the PTM path and/or switches to PTP path. AT 912, the source network entity (200a) forwards the data and sends the not yet acknowledged PDUs to the target network entity (200b).

At 914, the UE (100) sends the RRC reconfiguration complete message to the target network entity (200b). At 916, the UE (100) determines the missing PDUs and/or generates the PDCP status report. At 918, the UE (100) sends the PDCP status report to the target network entity (200b). At 920, the target network entity (200b) determines the PDCP PDU for retransmission based on PDCP status report. At 922, the target network entity (200b) retransmits the determined PDCP PDU to the UE (100) over the PTP path. At 924, the target network entity (200b) may send the RRC reconfiguration message to the UE (100) and adds the PTM path between the target network entity (200b) and the UE (100) based on the RRC reconfiguration message.

Figure 10:
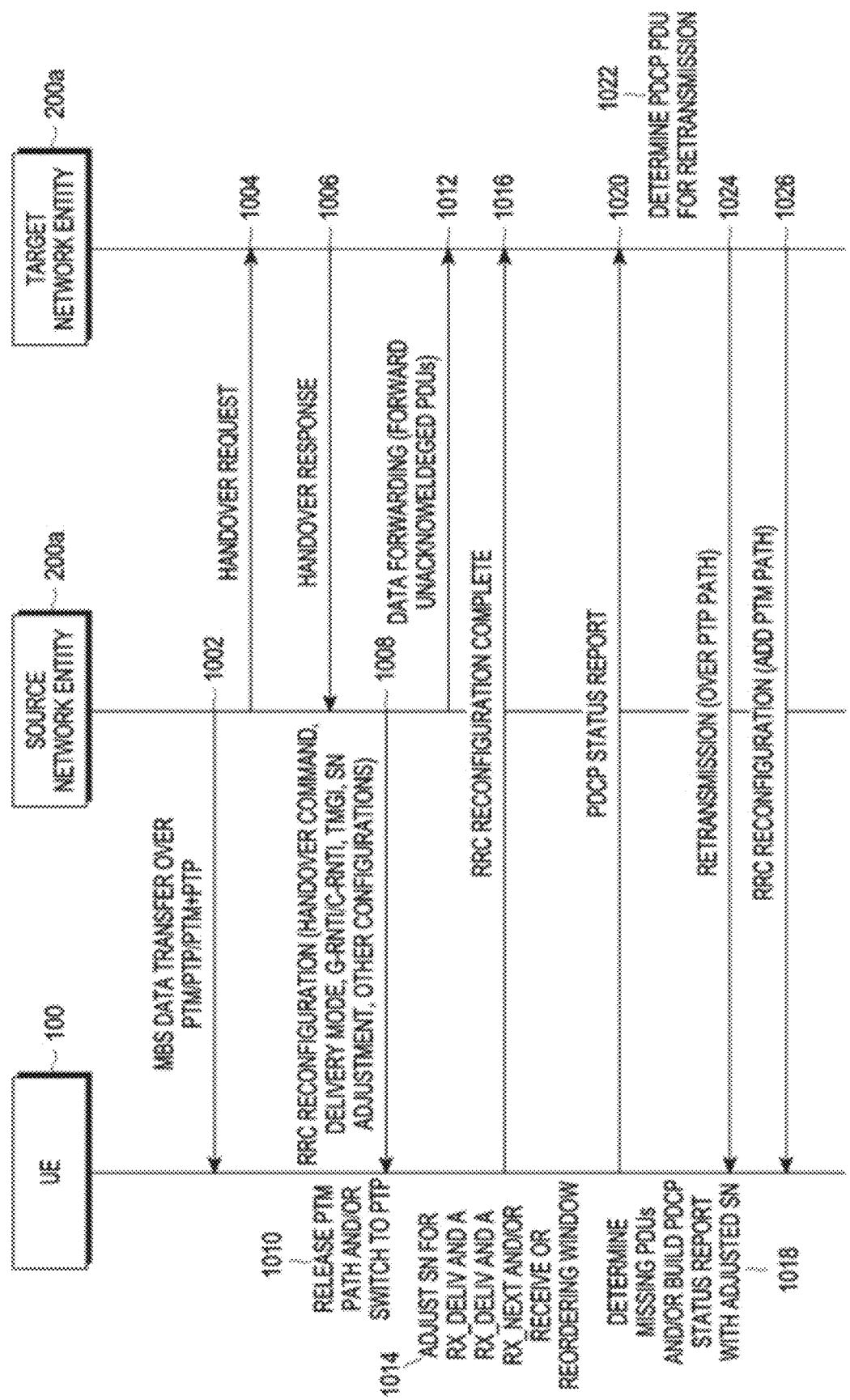

As shown in the FIG. 10, at 1002, the source network entity (200a) sends the MBS data to the UE (100) over PTM/PTP/PTM+PTP. At 1004, the source network entity (200a) sends the handover request to the target network entity (200b). At 1006, the target network entity (200b) sends the handover response to the source network entity (200a) based on the handover request. At 1008, the source network entity (200a) sends the RRC reconfiguration message to the UE (100). The RRC reconfiguration message includes the handover command, the delivery mode, the G-RNTI, the C-RNTI, the TMGI, the SN adjustment information and other configurations. Based on the RRC reconfiguration message, at 1010, the UE (100) releases the PTM path and/or switches to the PTP path. At 1012, the source network entity (200a) forwards the data and sends the not yet acknowledged PDUs to the target network entity (200b). At 1014, the SN adjustment information is used for updating RX_DELIV and a RX_NEXT and/or receive or reordering window. The SN adjustment information modifies a PDCP reordering window as and when the RX_DELIV and a RX_NEXT is incremented or decremented, At 1016, the UE (100) sends the RRC reconfiguration complete message to the target network entity (200b). At 1018, the UE (100) determines the missing PDUs and/or generates the PDCP status report with utilizing SN adjustment information. At 1020, the UE (100) sends the PDCP status report to the target network entity (200b). At 1022, the target network entity (200b) determines the PDCP PDU for retransmission. At 1024, the target network entity (200b) retransmits the determined PDCP PDU to the UE (100) over the PTP path. At 1026, the target network entity (200b) send the RRC reconfiguration message to the UE (100) and adds the PTP path between the target network entity (200b) and the UE (100) based on the RRC reconfiguration message.

Figure 11:
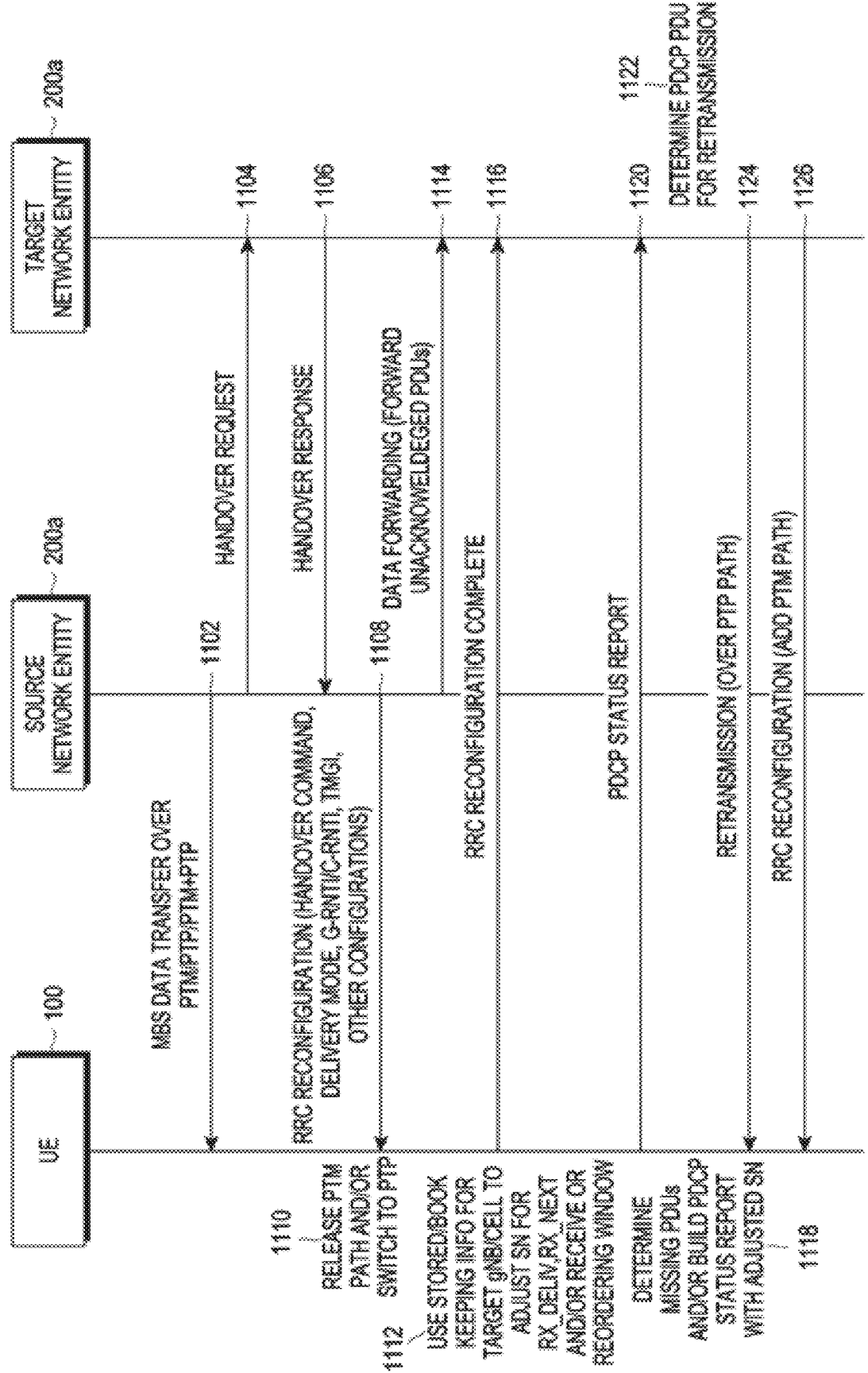

As shown in the FIG. 11, At 1102, the source network entity (200a) sends the MBS data to the UE (100) over PTM/PTP/PTM+PTP. At 1104, the source network entity (200a) sends the handover request to the target network entity (200b). At 1106, the target network entity (200b) sends the handover response to the source network entity (200a) based on the handover request. At 1108, the source network entity (200a) sends the RRC reconfiguration message to the UE (100). The RRC reconfiguration message includes the handover command, the delivery mode, the G-RNTI, the C-RNTI, the TMGI, and other configurations. Based on the RRC reconfiguration message, at 1110, the UE (100) releases the PTM path and/or switches to the PTP path.

At 1112, the SN adjustment is used for RX_DELIV and a RX_NEXT and/or receive or reordering window. The UE (100) uses the stored/book keeping info for target network entity (200b)/cell to derive the SN adjustment information. The SN adjustment information modifies a PDCP reordering window as and when the RX_DELIV and a RX_NEXT is incremented or decremented. At 1114, the source network entity (200a) forwards the data and sends the not yet acknowledged PDUs to the target network entity (200b).

At 1116, the UE (100) sends the RRC reconfiguration complete message to the target network entity (200b). At 1118, the UE (100) determines the missing PDUs and/or generates the PDCP status report with utilizing adjusted SN information. At 1120, the UE (100) sends the PDCP status report to the target network entity (200b). At 1122, the target network entity (200b) determines the PDCP PDU for retransmission. At 1124, the target network entity (200b) retransmits the determined PDCP PDU to the UE (100) over the PTP path. At 1126, the target network entity (200b) may send the RRC reconfiguration message to the UE (100) and adds the PTM path between the target network entity (200b) and the UE (100) based on the RRC reconfiguration message.

Figure 12:
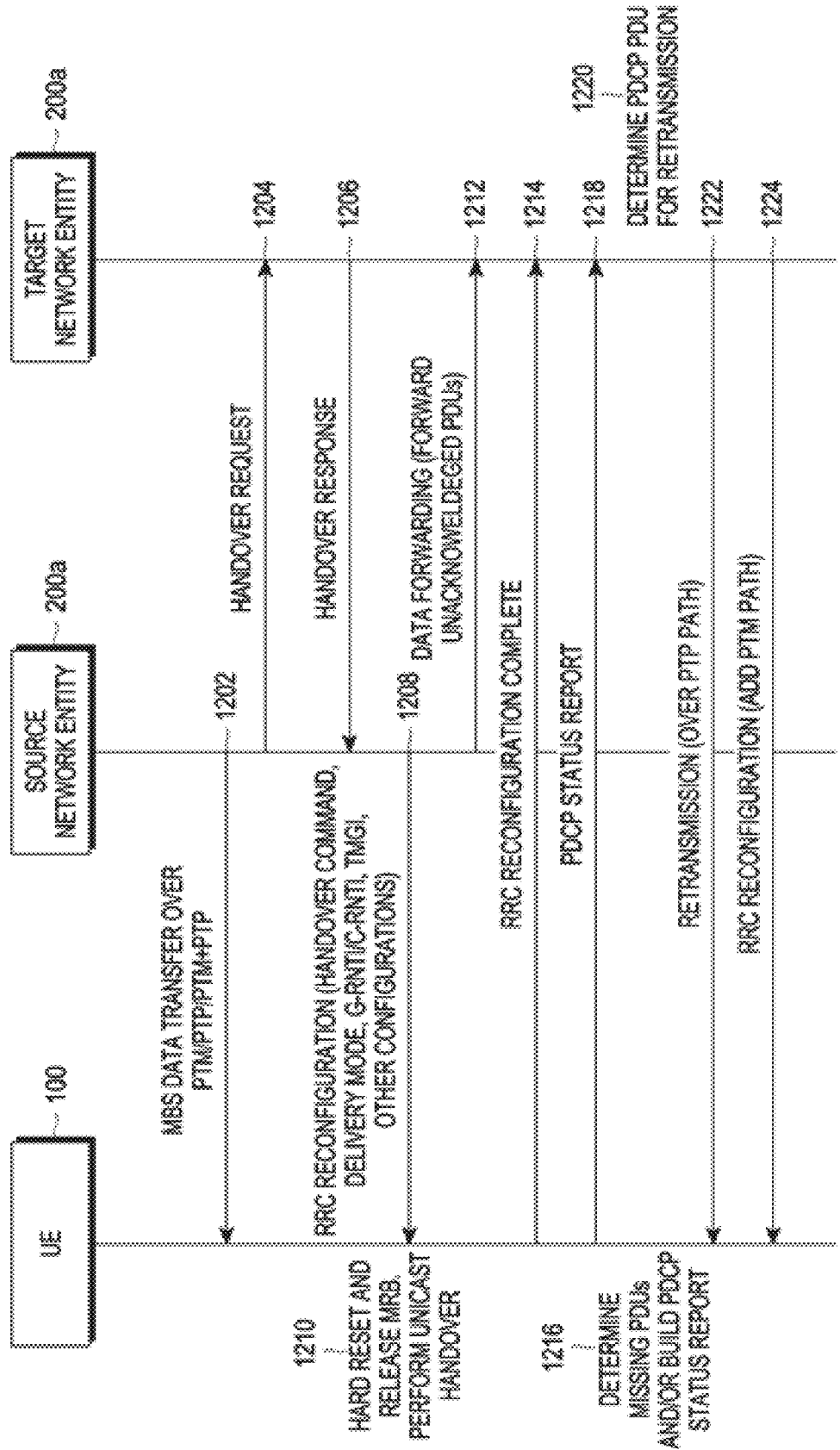

As shown in the FIG. 12, At 1202, the source network entity (200a) sends the MBS data to the UE (100) over PTM/PTP/PTM+PTP. At 1204, the source network entity (200a) sends the handover request to the target network entity (200b). At 1206, the target network entity (200b) sends the handover response to the source network entity (200a) based on the handover request. At 1208, the source network entity (200a) sends the RRC reconfiguration message to the UE (100). The RRC reconfiguration message includes the handover command, the delivery mode, DRB configuration, the G-RNTI, the C-RNTI, the TMGI, and other configurations.

Based on the RRC reconfiguration message, at 1210, the UE (100) performs the hard reset and releases MRB. The UE (100) may switch from the MRB to DRB before or during the handover procedure. The switching from the MRB to the DRB is performed when the source network entity (200a) and the target network entity (200b) are not synchronized for PDCP SN, wherein the RRC reconfiguration message does not provide SN adjustment information. The RRC reconfiguration message does not provide SN adjustment information. This further involves releasing of MRB and an addition of DRB before or during the handover procedure. Further, the UE (100) performs the unicast handover. At 1212, the source network entity (200a) forwards the data and sends the not yet acknowledged PDUs to the target network entity (200b).

At 1214, the UE (100) sends the RRC reconfiguration complete message to the target network entity (200b). At 1216 the UE (100) determines the missing PDUs and/or generates the PDCP status report. At 1218, the UE (100) sends the PDCP status report to the target network entity (200b). At 1220, the target network entity (200b) determines the PDCP PDU for retransmission. At 1222, the target network entity (200*b*) retransmits the determined PDCP PDU to the UE (100) over the DRB or PTP path. At 1224, the target network entity (200*b*) send the RRC reconfiguration message to the UE (100) and may add the PTM path between the target network entity (200*b*) and the UE (100) based on the RRC reconfiguration message.

Figure 13:
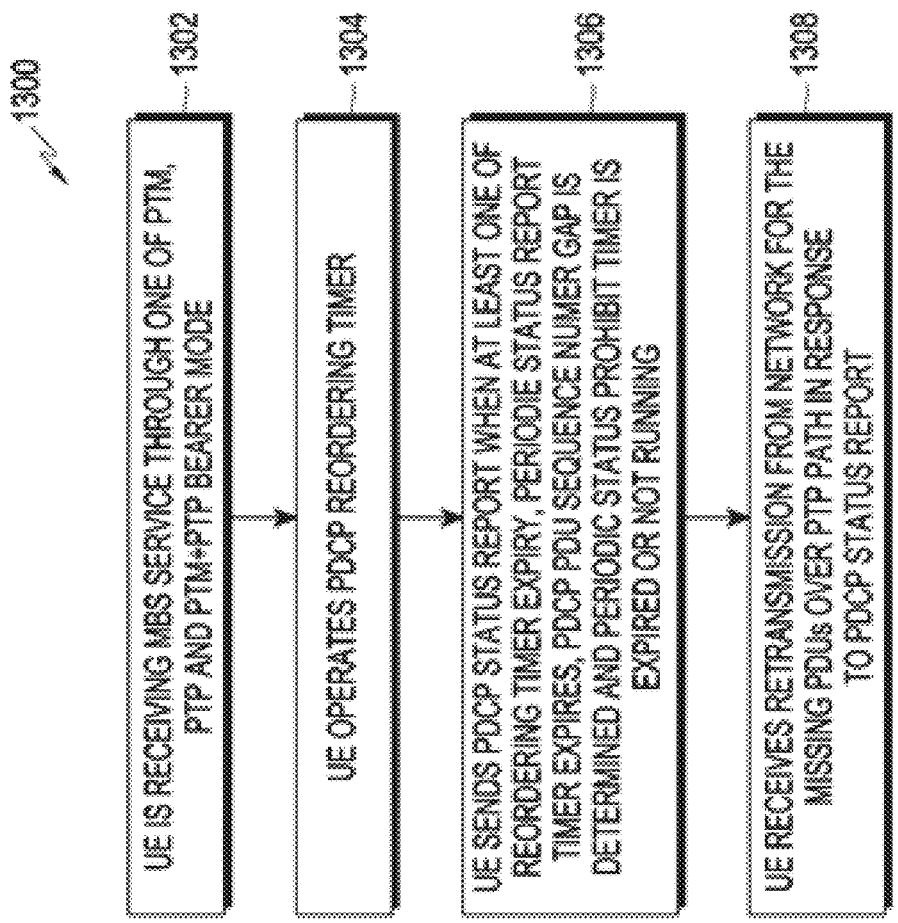
FIG. 13 is a flow chart illustrating a method, implemented by the UE, for handling the lossless operations for the MBS in the 5G communication network, according to embodiments as disclosed herein.

FIG. 13 is a flow chart (1300) illustrating a method, implemented by the UE (100), for handling the lossless operations for the MBS in the 5G communication network (1000*a*), according to embodiments as disclosed herein. The operations (1302-1308) are performed by the PDCP status report based MBS controller (110).

At 1302, the UE (100) is receiving the MBS service through one of the PTM, the PTP and the PTM+PTP bearer mode. At 1304, the UE (100) operates the PDCP reordering timer. At 1306, the UE (100) sends the PDCP status report when the at least one of reordering timer expiry, the periodic status report timer expires, the PDCP PDU sequence number gap is determined and the periodic status prohibit timer is expired or not running. At 1308, the UE (100) receives retransmission from the network entity (200) for the missing PDUs over the PTP path in response to the PDCP status report.

FIG. 14 is a flow chart (1400) illustrating a method for handling the lossless operations for the MBS in the 5G communication network (1000*a*), according to embodiments as disclosed herein. At 1402, the network entity (200) configures the MBS status report required parameter with the RRC reconfiguration in order to support the PDCP status report. At 1404, the UE (100) is receiving the MBS service through one of the PTM, the PTP and the PTM+PTP bearer mode. At 1406, the UE (100) operates the PDCP reordering timer. At 1408, If the MBS status report required parameter is configured, the UE (100) sends the PDCP status report when at least one of the reordering timer is expired, the periodic status report timer expires, the PDCP PDU sequence number gap is determined and periodic status prohibit timer is expired or not running. At 1410, the UE (100) receives the retransmission from the network entity (200) for the missing PDUs over PTP path in response to the PDCP status report.

The various actions, acts, blocks, steps, or the like in the flow charts (600, 700, 1300 and 1400) may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

The invention claimed is:

1. A method by a first network entity for handling lossless operation for a multicast broadcast service (MBS) in a wireless communication network, the method comprising:
   transmitting, to a user equipment (UE) over at least one of a point-to-multipoint (PTM) path or a point-to-point (PTP) path, MBS data;
   transmitting, to the UE, a radio resource control (RRC) reconfiguration message;
   receiving, from the UE, an RRC reconfiguration complete message based on the RRC reconfiguration message; and
   receiving, from the UE, a packet data convergence protocol (PDCP) status report,
   wherein the RRC reconfiguration message includes information on MBS bearer type change.

2. The method of claim 1, further comprising adding the PTP path between the first network entity and the UE based on the RRC reconfiguration message.

3. The method of claim 1, wherein receiving, from the UE, the PDCP status report comprises:
   receiving, from a second network entity, a handover request message, wherein the second network entity transfers the MBS data to the UE over at least one of the PTM path or the PTP path, wherein the second network entity is a source network entity and the first network entity is a target network entity;
   transmitting, to the second network entity, a handover response message based on the handover request message;
   receiving, from the second network entity, PDUs based on the handover response message, wherein the received PDUs are not yet acknowledged;
   receiving, from the UE, an RRC reconfiguration complete message upon transmitting the RRC reconfiguration message to the UE from the second network entity; and
   receiving, from the UE, the PDCP status report.

4. The method of claim 1, wherein receiving, from the UE, the PDCP status report comprises:
   configuring an MBS status report required parameter with the RRC reconfiguration message;
   transmitting, to the UE, the RRC reconfiguration message comprising the MBS status report required parameter; and
   receiving, from the UE, the PDCP status report based on the MBS status report required parameter.

5. The method of claim 1, wherein the MBS bearer type change is performed at the first network entity,
   wherein a handover procedure involving an MBS bearer is performed between the first network entity and a second network entity, and
   wherein the second network entity is a source network entity and the first network entity is a target network entity.

6. The method of claim 1, wherein the RRC reconfiguration message further includes sequence number (SN) adjustment information, and wherein the SN adjustment information is applied to the PDCP status report.

7. A method by a user equipment (UE) for handling a multicast broadcast service (MBS) in a wireless communication network, the method comprising:
   receiving, from a first network entity over at least one of a point-to-multipoint (PTM) path or a point-to-point (PTP) path, MBS data;

receiving, from the first network entity, a radio resource control (RRC) reconfiguration message;

transmitting, to the first network entity, an RRC reconfiguration complete message based on the RRC reconfiguration message; and transmitting, to the first network entity, a packet data convergence protocol (PDCP) status report, wherein the RRC reconfiguration message includes information on MBS bearer type change.

8. The method of claim 7, further comprising establishing the PTP path between the first network entity and the UE based on the RRC reconfiguration message.

9. The method of claim 7, further comprising switching from an MBS radio bearer (MRB) to a dedicated radio bearer (DRB).

10. The method of claim 7, wherein the RRC reconfiguration message includes sequence number (SN) adjustment information, and wherein the SN adjustment information is applied to the PDCP status report.

11. The method of claim 7, wherein transmitting, to the first network entity, the PDCP status report comprises:

receiving, from the first network entity, an RRC reconfiguration message comprising an MBS status report required parameter; and transmitting, to the first network entity, the PDCP status report based on the MBS status report required parameter.

12. The method of claim 7, wherein the MBS bearer type change is performed at the first network entity, wherein a handover procedure involving an MBS bearer is performed between the first network entity and a second network entity, and wherein the second network entity is a source network entity and the first network entity is a target network entity.

13. A first network entity for handling lossless operation for a multicast broadcast service (MBS) in a wireless communication network, the first network entity comprising:

a memory, and at least one processor coupled with the memory, and configured to:

transmit, to a user equipment (UE) over at least one of a point-to-multipoint (PTM) path or a point-to-point (PTP) path, MBS data;

transmit, to the UE, a radio resource control (RRC) reconfiguration message;

receive, from the UE, an RRC reconfiguration complete message based on the RRC reconfiguration message; and receive, from the UE, a packet data convergence protocol (PDCP) status report, wherein the RRC reconfiguration message includes information on MBS bearer type change.

* * * * *